(12) United States Patent
Nihira et al.

(10) Patent No.: US 6,756,964 B2
(45) Date of Patent: Jun. 29, 2004

(54) MAGNETOPHORESIS TYPE DISPLAY DEVICE AND PROCESS OF PRODUCTION OF SAME

(75) Inventors: Yoshito Nihira, Tokyo (JP); Takahiro Itou, Tokyo (JP); Kenji Imamura, Tokyo (JP)

(73) Assignee: Takara Corporation Limited, Tokyo (JP)

( * ) Notice: Subject to any disclaimer, the term of this patent is extended or adjusted under 35 U.S.C. 154(b) by 0 days.

(21) Appl. No.: 10/459,478

(22) Filed: Jun. 12, 2003

(65) Prior Publication Data

US 2003/0218600 A1 Nov. 27, 2003

Related U.S. Application Data

(62) Division of application No. 09/417,028, filed on Oct. 12, 1999, now Pat. No. 6,639,579.

(30) Foreign Application Priority Data

| Oct. 16, 1998 | (JP) | 10-295346 |
| Feb. 1, 1999 | (JP) | 11-23588 |
| Feb. 1, 1999 | (JP) | 11-23826 |
| Feb. 1, 1999 | (JP) | 11-23886 |
| Apr. 22, 1999 | (JP) | 11-114761 |

(51) Int. Cl.$^7$ .............................................. G09G 3/34
(52) U.S. Cl. ................................................. 345/107
(58) Field of Search ....................... 345/107, 173, 345/179, 86; 434/409, 404, 410; 445/60

(56) References Cited

U.S. PATENT DOCUMENTS

| 4,143,472 A | * | 3/1979 | Murata et al. | 434/409 |
| 4,675,476 A | * | 6/1987 | Kobayashi | 345/173 |
| 5,057,363 A | * | 10/1991 | Nakanishi | 428/321.5 |
| 5,151,032 A | * | 9/1992 | Igawa | 434/409 |
| 5,429,503 A | * | 7/1995 | Murata et al. | 434/409 |
| 6,299,972 B1 | * | 10/2001 | Iwasaki et al. | 428/323 |
| 6,639,579 B1 | * | 10/2003 | Nihira et al. | 345/107 |

FOREIGN PATENT DOCUMENTS

| JP | 52-37059 | 3/1977 |
| JP | Y2-56-35356 | 8/1981 |
| JP | B2-57-46439 | 10/1982 |
| JP | B2-59-47676 | 11/1984 |
| JP | 2-193185 | 7/1990 |
| JP | A-04-106581 | 4/1992 |
| JP | A-04-199086 | 7/1992 |
| JP | A-04-199087 | 7/1992 |
| JP | 7-29146 | 1/1995 |
| JP | B2-8-7532 | 1/1996 |
| JP | A-8-183291 | 7/1996 |
| JP | 9-71042 | 3/1997 |
| JP | U-3047170 | 1/1998 |
| JP | 10-44689 | 2/1998 |
| JP | U-3048929 | 3/1998 |
| JP | A-10-171381 | 6/1998 |
| JP | A-10-197908 | 7/1998 |
| JP | A-10-282908 | 10/1998 |
| JP | A-11-149265 | 6/1999 |

* cited by examiner

Primary Examiner—Steven Saras
Assistant Examiner—Fritz Alphonse
(74) Attorney, Agent, or Firm—Oliff & Berridge, PLC

(57) ABSTRACT

A magnetophoresis type display device is provided with a transparent front panel sheet, a back panel sheet arranged with respect to the front panel sheet so as to form a sealed space with it, and a partitioning member is between the front panel sheet and the back panel sheet for partitioning the sealed space into a large number of cells, where a liquid dispersion containing magnetic particles is sealed inside the cells formed by partitioning by the partitioning member.

18 Claims, 12 Drawing Sheets

FIG. 11A BRAKES IN MIDDLE OF LINE
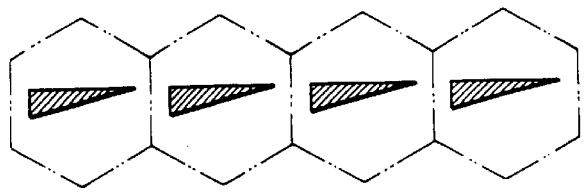
FIG. 11B BLURRING OF LETTER
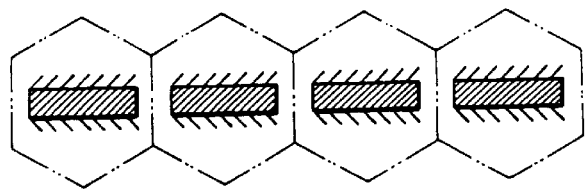
FIG. 11C BRAKES AT BOUNDARY PORTIONS
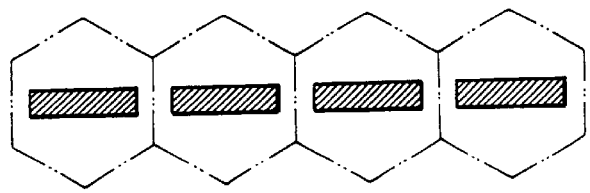
FIG. 11D EXAMPLE OF PRESENT INVENTION
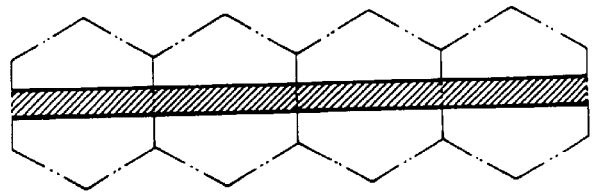

MAGNETOPHORESIS TYPE DISPLAY DEVICE AND PROCESS OF PRODUCTION OF SAME

This is a Divisional Application of U.S. application Ser. No. 09/417,028 filed Oct. 12, 1999 now U.S. Pat. No. 6,639,579 the contents of which are incorporated herein in its entirety.

BACKGROUND OF THE INVENTION

1. Field of the Invention

The present invention relates to a magnetophoresis type display device which makes use of a magnetic field to make magnetic particles sealed in the display device magnetically float and display an object and to a process of production of the same.

2. Description of the Related Art

Known in the art for example are the magnetophoresis type monochrome display devices disclosed in Japanese Examined Patent Publication (Kokoku) No. 59-47676, Japanese Examined Patent Publication (Kokoku) No. 57-46439, and Japanese Utility Model Registration No. 1428562. In these magnetophoresis type monochrome display devices, the sealed space between the display panel sheet and the back panel sheet is divided into a large number of cells in which are sealed liquid dispersions containing black magnetic particles and a white fluid. By moving a recording magnetic member etc. (for example a "magnetic pen") in contact with the outer surface of the front panel sheet, the black magnetic particles in the dispersion sealed in the cells corresponding to the path traced by that member magnetically float from the bottom to the front panel sheet side by the magnetic action of the member. As a result, some sort of monochrome display is formed by the difference in contrast between the white fluid and the black magnetic particles at the outer surface of the transparent front panel sheet.

Further, Japanese Examined Patent Publication (Kokoku) No. 8-7532 discloses the various conditions for the black magnetic particles in the liquid dispersion sealed in a magnetophoresis type monochrome display device for obtaining a good monochrome image display at the outer surface of the front panel sheet. Further, Japanese Unexamined Patent Publication (Kokai) No. 8-183291 discloses that the content of the black magnetic particles in the liquid dispersion sealed in the magnetophoresis type display device should be 15 to 20 parts by weight with respect to 100 parts by weight of the dispersion medium.

Further, recently, as shown in Japanese Unexamined Patent Publication (Kokai) No. 11-149265, Japanese Utility Model Registration No. 3048929, and Japanese Utility Model Registration No. 3047170, magnetophoresis type color display devices able to display multiple colors have also been proposed.

In such magnetophoresis type display devices of the related art, it has been sought to eliminate the image breaks in display at the boundary portions of the individual cells and improve the black and white contrast or the color contrast.

In particular, in magnetophoresis type color display devices, a display device which is free from color bleeding, has clear hues, and can improve the resolution of the color display image has been sought.

In order to obtain a good image display at the outer surface of a front panel sheet, in particular to eliminate the image breaks in display at the boundary portions of the individual cells and improve the contrast of the display image and the resolution of the display image, however, it was made clear by experiments of the present inventors that it is not enough to specify certain conditions of the magnetic particles and, further, it is not enough to just define a certain content of the magnetic particles in the liquid dispersion.

Further, in the magnetophoresis type display devices of the related art, there was the problem of disposal since the front panel sheets were made of polyvinyl chloride. Further, in the process of production of magnetophoresis type display devices of the related art, the work of precisely filling the liquid dispersion containing the magnetic particles in the individual cells was difficult. The individual cells were liable to be either filled too much or too little with the liquid dispersion. Due to this, problems were liable to occur such as image breaks in the display at boundary portions of the individual cells or a reduction in the black and white contrast or color contrast.

SUMMARY OF THE INVENTION

The present invention was made in view of this situation and has as its first object to provide a magnetophoresis type display device which can display an excellent image at the front panel sheet, in particular can eliminate the image breaks in display at the boundary portions of the individual cells and can improve the contrast of the display image and the resolution of the display image.

Further, the present invention has as its second object to provide a magnetophoresis type color display device which can display a color image, in particular can eliminate the image breaks in display at the boundary portions of the individual cells, eliminate color bleeding, give clear hues, and improve the resolution of the color display image.

Further, the present invention has as its third object to provide a magnetophoresis type display device which is environmentally friendly at the time of disposal and further which can eliminate the image breaks in display at the boundary portions of the individual cells and can improve the contrast and a process for production of the same.

Still further, the present invention has as its fourth object to provide a process for production of a magnetophoresis type display device which facilitates the precise filling of a liquid dispersion containing magnetic particles in the individual cells and thereby enables the liquid dispersion to be filled in the individual cells without excess or shortage.

The present inventors engaged in intensive studies to achieve the first object and as a result discovered that by defining the effective magnetic flux densities at the panel surface due to the recording magnetic member and the erasing magnetic member and maintaining an overall predetermined relationship among the various conditions of the magnetic particles, the ratio of content of the magnetic particles in the liquid dispersion, etc. it was first possible to eliminate the image breaks in display at the boundary portions of the individual cells and improve the contrast of the display image and the resolution of the display image and thereby completed a first aspect of the present invention.

That is, according to the first aspect of the present invention, there is provided a magnetophoresis type display device (including magnetophoresis type color display device, same below) comprising:

a transparent front panel sheet, a back panel sheet arranged with respect to the front panel sheet so as to form a sealed space with it, a partitioning member provided between the front panel sheet and the back panel sheet for partitioning the sealed space into a large number of cells, a liquid dispersion containing magnetic particles to be sealed inside the cells formed by partitioning by the partitioning member, a recording magnetic member provided to be able to move along the outer surface of the front panel sheet and having a magnetic force of an extent giving an effective magnetic flux density of 100 to 500 Gauss at the outer surface of the back panel sheet in the state when the recording magnetic member is brought into contact with the outer surface of the front panel sheet, and an erasing magnetic member arranged at the outer surface of the back panel sheet and having a magnetic force of an extent giving an effective magnetic flux density of 100 to 1500 Gauss at the outer surface of the front panel sheet in the state when the erasing magnetic member is brought into contact with the outer surface of the back panel sheet.

When the magnetic force of the recording magnetic member and/or the erasing magnetic member is too small, the magnetophoresis action in the cells is weak, so the display/erasure at the display device tends to become difficult. Further, when the magnetic force is too large, the magnetic field is too strong, so even magnetic particles which should originally not be made to magnetically float end up magnetically floating and detract from the resolution of the displayed object at the screen.

Further, to achieve the first object, according to a second aspect of the present invention, there is provided a magnetophoresis type display device comprising:

a transparent front panel sheet, a back panel sheet arranged with respect to the front panel sheet so as to form a sealed space with it, a partitioning member provided between the front panel sheet and the back panel sheet for partitioning the sealed space into a large number of cells, and a liquid dispersion containing magnetic particles to be sealed inside the cells formed by partitioning by the partitioning member, the magnetic particles having a magnetization of at least 20.0 emu/g when a magnetic field of 500 Oe is applied to the magnetic particles, more preferably at least 22.0 emu/g and the liquid dispersion containing 80 to 90 wt % of a single-color fluid and 10 to 20 wt % of magnetic particles.

In the present invention, if the ratio of content of the magnetic particles in the liquid dispersion is too low, the amount of the magnetic particles will be too small, so the resolution of the displayed object at the screen of the display device will end up deteriorating. For example, lines or letters will become thinner and may be broken in the middle. Further, if the ratio of content of the magnetic particles is too high, the density of the displayed object at the screen of the display device can be made high, but the single-color fluid will easily be contaminated and therefore the single color (for example, white) of the panel will become weaker at the time of erasure and the contrast will be reduced.

The magnetic particles have a magnetization of at least 20.0 emu/g when a magnetic field of 500 Oe is applied to the magnetic particles, more preferably at least 22.0 emu/g and, further, have a magnetization of at least 8.0 emu/g when a magnetic field of 200 Oe is applied to the magnetic particles, more preferably at least 10.0 emu/g. The magnetic particles must have a magnetization enabling magnetophoresis by the action of the low magnetic field of the recording magnetic member or the erasing magnetic member. By giving them this range of magnetization, the magnetic particles sufficiently magnetically float and the display and/or erasure at the screen of the display device is improved.

The viscosity of the single-color fluid is preferably 200 to 800 cp at 25° C., more preferably 300 to 600 cp. If the viscosity of the single-color fluid (white fluid) is too low, the single color (whiteness) of the single-color fluid (white fluid) will become weak and will tend not to be able to completely conceal the color of the colored magnetic particles from the screen when erasing an image (displaying the single color at the screen). If the viscosity of the single-color fluid (white fluid) is too high, the single color (whiteness) of the single-color fluid (white fluid) will end up concealing the hue of the magnetic particles resulting in the inability to obtain a clear hue display and further preventing smooth magnetophoresis of the magnetic particles and necessitating an increase in the magnetic flux density of the recording magnetic member or erasing magnetic member.

As the single-color fluid, one of a color having a high contrast with respect to the color of the magnetic particles is preferred. While not particularly limited, a white fluid is preferred. Further, as the coloring agent contained in the magnetic particles, a black coloring agent is preferred. As the black coloring agent, carbon is preferably used.

The white fluid may be one including at least titanium oxide and silicon oxide in which when the total weight of the white fluid is 100 wt %, the wt % of the titanium oxide in the white fluid is C, and the wt % of the silicon oxide is D, the weight ratio C/D is preferably in the relationship of $1 \leq C/D \leq 2.5$, more preferably $1.2 \leq C/D \leq 2.0$.

If C/D is too small, the viscosity of the white fluid (single-color fluid) becomes high—preventing smooth magnetophoresis of the magnetic particles and necessitating an increase in the magnetic flux density of the recording magnetic member or erasing magnetic member. Further, the resolution of the displayed object displayed at the screen of the display device tends to end up deteriorating.

If C/D is too large, when the display device is left standing, the white fluid (single-color fluid) will tend to end up separating into a dispersion medium (paraffin etc.) layer and oxide (titanium oxide, silicon oxide, etc.) layer in a short time, which will make it impossible to display the color of the magnetic particles clearly at the screen. For example, when a recording magnetic member such as a magnetic stamp is brought into contact with the screen to make something be displayed on the screen, the white particles (single-color particles) comprised of the oxides will end up floating up in the direction of the screen together with the magnetic particles and will prevent the color of the magnetic particles from being reproduced clearly at the screen.

The white fluid may also be one including at least titanium oxide and silicon oxide in which when the total weight of the white fluid is 100 wt %, the wt % of the titanium oxide in the white fluid is C, and the wt % of the silicon oxide is D, the weight C+D is preferably in the relationship of 3.0 wt $\% \leq C+D \leq 6.0$ wt %, more preferably 3.5 wt $\% \leq C+D \leq 5.5$ wt %. If the ratio of content of C+D is too small, the whiteness (single color chromaticity) in the white fluid will be low and the white (single color) at the screen will be inferior, so the screen of the display device will tend to appear dirty. Further, if the ratio of content of C+D is too large, the viscosity of the white fluid (single-color fluid) becomes high—preventing smooth magnetophoresis of the magnetic particles and necessitating an increase in the magnetic flux density of the recording magnetic member or erasing magnetic member. Further, the resolution of the displayed object displayed at the screen of the display device tends to end up deteriorating.

The white fluid may be one including at least isoparaffin and a mixture of a plurality of white inorganic oxides in which when the total weight of the white fluid is 100 wt %, the wt % of the isoparaffin in the white fluid is A and the wt % of the mixture of the white inorganic oxides is B, the weight ratio A/B is preferably in the relationship of $10 \leq A/B \leq 20$.

The single-color fluid may be one including at least a dispersion medium (not limited to isoparaffin and including other dispersion media) and a single-color pigment (not limited to white inorganic oxides and including other pigments, dyes, coloring agents, etc. and also not limited to white) in which when the total weight of the single-color fluid is 100 wt %, the wt % of the dispersion medium in the single-color fluid is A', and the wt % of the single-color pigment is B', the weight ratio A'/B' is preferably in the relationship of $10 \leq A'/B' < 20$.

If the weight ratio A/B (A'/B') is too large, the whiteness (single color) of the white fluid (single-color fluid) will become weak and will tend not to be able to completely erase the color of the magnetic particles when erasing a display image and the panel screen will appear dirty. Further, if A/B (A'/B') is too small, the whiteness (single color) of the white fluid (single-color fluid) will end up concealing the hue of the magnetic particles resulting in the inability to obtain a clear hue display.

The magnetophoresis type display device according to the second aspect of the present invention may further comprise a recording magnetic member able to move along the outer surface of the front panel sheet, the recording magnetic member preferably having a magnetic force of an extent giving an effective magnetic flux density of 100 to 300 Gauss at the outer surface of the back panel sheet in the state when the recording magnetic member is brought into contact with the outer surface of the front panel sheet. The specific shape of the recording magnetic member is not particularly limited and may include a magnetic pen or a magnetic stamp or various forms.

Further, the magnetophoresis type display device according to the second aspect of the present invention may further comprise an erasing magnetic member arranged at the outer surface of the back panel sheet, the erasing magnetic member having a magnetic force of an extent giving an effective magnetic flux density of 100 to 300 Gauss at the outer surface of the front panel sheet in the state when the erasing magnetic member is brought into contact with the outer surface of the back panel sheet. The erasing magnetic member is preferably arranged to be able to move along the outer surface of the back panel sheet.

The thickness of the sealed space is preferably 0.8 to 1.5 mm, more preferably 1.00 to 1.40 mm. If the thickness is too small, it is necessary to adjust the single-color chromaticity (for example, white chromaticity) of the single-color fluid for concealing the hue of the magnetic particles in the cells by including a larger amount of the single-color particles (for example, white particles) in the single-color fluid. As a result, the viscosity of the single-color fluid becomes high—preventing smooth magnetophoresis of the magnetic particles and necessitating an increase in the magnetic flux density of the recording magnetic member or erasing magnetic member. Further, the resolution of the displayed object displayed at the screen of the display device tends to end up deteriorating.

Further, if the thickness of the sealed space is too large, in order to make the magnetic particles sufficiently magnetically float to the front panel sheet side in the cells, since the magnetophoresis distance is long, it is necessary to increase the magnetic flux density of the recording magnetic member or the erasing magnetic member. Further, the magnets attached to the recording or erasing magnetic member end up becoming higher in cost. Further, the resolution of the displayed object displayed at the screen of the display device tends to end up deteriorating.

The magnetic particles preferably contain 60 to 90 wt %, more preferably 70 to 85 wt % of a magnetic material and 10 to 40 wt %, more preferably 15 to 30 wt % of a synthetic resin and/or coloring agent. By using these magnetic particles, the image breaks in the display at the boundary portions of the cells are eliminated and the display quality is improved.

Further, the mean particle size of the magnetic particles is preferably 50 to 200 $\mu$m, more preferably 75 to 150 $\mu$m. By using magnetic particles of such a particle size, the resolution at the screen of the display device is improved, the cause of contamination of the single-color fluid is eliminated, and the display quality is improved.

The front panel sheet is preferably comprised of polyethylene terephthalate.

The partitioning member is not particularly limited, but preferably is a honeycomb structure having a large number of substantially regular hexagonal tubular cells. The honeycomb structure preferably is comprised of paper coated with a resin. Further, it may be comprised of microcapsules in which a liquid dispersion is sealed.

The partitioning member is preferably a resin-coated paper because compared with a synthetic resin, paper is a natural material, can be formed thin, lacks transparency, can completely conceal the color of the magnetic particles present at the bottom of the cell space at the time of erasure of the screen, and results in little breaks in lines at the boundary portions at the time of display of an image.

To achieve the first object, according to a third aspect of the present invention, there is provided a magnetophoresis type display device comprising:

a transparent front panel sheet, a back panel sheet arranged with respect to the front panel sheet so as to form a sealed space with it, a partitioning member provided between the front panel sheet and the back panel sheet for partitioning the sealed space of a thickness of 0.8 to 1.5 mm into a large number of cells, and a liquid dispersion containing magnetic particles to be sealed inside the cells formed by partitioning by the partitioning member, the magnetic particles containing 60 to 90 wt % of a magnetic material and 10 to 40 wt % of a synthetic resin and/or coloring agent, the mean particle size of the magnetic particles being 50 to 200 $\mu$m, the magnetization of the magnetic particles when a 200 Oe magnetic field is applied to the magnetic particles being at least 8.0 emu/g, and the magnetization of the magnetic particles when a 500 Oe magnetic field is applied to the magnetic particles being at least 20.0 emu/g, the liquid dispersion containing 80 to 90 wt % of a single-color fluid and 10 to 20 wt % of magnetic particles.

Further, the present inventors engaged in intensive studies to achieve the second object and as result discovered that by maintaining the thickness of the sealed space between the front panel sheet and the back panel sheet, the various conditions of the colored magnetic particles, the various conditions of the liquid dispersion, etc. in an overall predetermined relationship, it was first possible to eliminate image breaks in display at the boundary portions of the individual cells, eliminate color bleeding, and improve the clearness of the hues and the resolution of a color display image and thereby completed a fourth aspect of the invention.

That is, according to the fourth aspect of the present invention, there is provided a magnetophoresis type color display device comprising:

a transparent front panel sheet, a back panel sheet arranged with respect to the front panel sheet so as to form a sealed space with it, a partitioning member provided between the front panel sheet and the back panel sheet for partitioning the sealed space of a thickness of 0.8 to 1.5 mm into a large number of cells, a first liquid dispersion containing first colored magnetic particles to be sealed inside selected specific cells formed by partitioning by the partitioning member, and a second liquid dispersion containing second colored magnetic particles to be sealed inside selected specific cells in the cells in which the first liquid dispersion is not sealed and colored different from the first colored magnetic particles, the mean particle sizes of the first colored magnetic particles and the second colored magnetic particles being 50 to 200 $\mu$m and the magnetization of the magnetic particles when a 500 Oe magnetic field is applied to the magnetic particles being at least 20.0 emu/g.

The first liquid dispersion is preferably a liquid comprised of a single-color fluid in which the first colored magnetic particles are dispersed, while the second liquid dispersion is preferably a single-color fluid in which the second colored magnetic particles are dispersed. Note that in addition to the first liquid dispersion and the second liquid dispersion, it is also possible to provide a third liquid dispersion containing third colored magnetic particles colored different from the first colored magnetic particles and the second colored magnetic particles. In this case, the colors of the first to third colored magnetic particles are mutually different and preferably ones of the three primary colors (red, green, and blue). Further, the magnetophoresis type color display device according to this aspect of the present invention may also have liquid dispersions containing magnetic particles colored different than the first to third colored magnetic particles.

In the case of a magnetophoresis type color display device, the recording magnetic member preferably has a magnetic force of an extent giving an effective magnetic flux density of 100 to 500 Gauss at the outer surface of the back panel sheet in the state when the recording magnetic member is brought into contact with the outer surface of the front panel sheet. Further, in the case of a magnetophoresis type color display device, the erasing magnetic member preferably has a magnetic force of an extent giving an effective magnetic flux density of 300 to 1500 Gauss at the outer surface of the front panel sheet in the state when the erasing magnetic member is brought into contact with the outer surface of the back panel sheet.

When the magnetic force of the recording magnetic member is too small, the magnetophoresis action in the cells is weak, so the display of color at the screen is difficult. Further, when the magnetic force of the recording magnetic member is too large, the magnetic field is too strong, so when the magnetically floating colored magnetic particles are displayed at the screen, the resolution of the color displayed object tends to be deteriorated.

Further, if the magnetic force of the erasing magnetic member is too small, the magnetophoresis action in the cells is weak, it becomes difficult to pull back the colored magnetic particles from the panel screen side, and the erasure of the displayed object at the screen tends to become difficult. Further, if the magnetic force of the erasing magnetic member is too large, the magnetic field is too strong, so the colored magnetic particles magnetically floating for erasure remain at the inner surface of the panel screen as "stubble" and therefore the display of the panel screen cannot be cleanly erased.

In the magnetophoresis type color display device according to the fourth aspect of the present invention, by establishing specific regions of limits for the thickness of the sealed space, the particle size of the colored magnetic particles, the magnetization characteristics, the viscosity and composition of the single-color fluid (white fluid), and/or the effective magnetic flux density of the recording magnetic member and the erasing magnetic member, it is possible to obtain a magnetophoresis type color display device which can give a clear color display at the panel screen and further can be cleanly erased.

The present inventors engaged in intensive studies to achieve the third object and as a result discovered that by specifying the material of the front panel sheet and the thickness of the sealed space between the front panel sheet and the back panel sheet, it is possible to obtain a device which is environmentally friendly when disposed of and further eliminates image breaks in display at the boundary portions of the individual cells and can improve the contrast and thereby completed a fifth aspect of the invention.

That is, according to the fifth aspect of the present invention, there is provided a magnetophoresis type display device comprising a transparent front panel sheet comprised of polyethylene terephthalate, a back panel sheet arranged with respect to the front panel sheet so as to form a sealed space with it, a partitioning member provided between the front panel sheet and the back panel sheet for partitioning the sealed space of a thickness of 0.8 to 1.5 mm into a large number of cells, and a liquid dispersion containing magnetic particles to be sealed inside the individual cells formed by partitioning by the partitioning member.

In the magnetophoresis type display device according to the fifth aspect, the recording magnetic member is not particularly limited, but preferably has a magnetic force of an extent giving an effective magnetic flux density of 100 to 500 Gauss at the outer surface of the back panel sheet in the state when the recording magnetic member is brought into contact with the outer surface of the front panel sheet. Further, the erasing magnetic member preferably has a magnetic force of an extent giving an effective magnetic flux density of 100 to 1500 Gauss at the outer surface of the front panel sheet in the state when the erasing magnetic member is brought into contact with the outer surface of the back panel sheet.

In the magnetophoresis type display device according to the fifth aspect of the present invention, the front panel sheet is comprised of polyethylene terephthalate (PET), so is easier to dispose of compared with a front panel sheet comprised of polyvinyl chloride and is environmentally friendly. Further, the present inventors discovered that the contrast at the panel screen is improved by making the material of the front panel sheet PET.

To achieve the third object, according to the present invention, there is provided a first process of production of a magnetophoresis type display device comprising the steps of:

attaching to a depression of a transparent front panel sheet formed with a depression at its inner surface and comprised of polyethylene terephthalate a partitioning member formed with a large number of cell spaces, filling the insides of the cell spaces of the partitioning member with a liquid dispersion containing magnetic particles, and bonding an inner surface of an outer periphery of a back panel sheet and an inner surface of an outer periphery of the front panel sheet together so as to seal the liquid dispersion filled at the insides of the cell spaces.

The process is preferably one in which the partitioning member is comprised of a honeycomb structure and is supplied with the honeycomb structure in a compact state and further comprises the steps of:

opening up the compact honeycomb structure so as to open up the cell spaces, coating a solidifying agent on the honeycomb structure in the state with the cell spaces opened up, and attaching the honeycomb structure coated with the solidifying agent to the depression of the front panel sheet.

According to the first process of production of the present invention, it is possible to extremely easily produce a magnetophoresis type display device which is easy to dispose of, is environmentally friendly, and can be improved in the contrast at the screen.

Further, the present inventors engaged in intensive studies to achieve the fourth object and as a result discovered that by filling the inside of the cell spaces of a partitioning member attached to a depression of a transparent front panel with a liquid dispersion containing magnetic particles and then squeegeeing the liquid dispersion protruding from the cell spaces of the partitioning member, it is possible to obtain a magnetophoresis type display device which eliminates image breaks in display at the boundary portions of the individual cells and can improve the contrast and thereby completed the next aspect of the present invention.

That is, according to the present invention, there is provided a second process of production of a magnetophoresis type display device comprising the steps of:

attaching to a depression of a transparent front panel sheet formed with a depression at its inner surface a partitioning member formed with a large number of cell spaces, filling the insides of the cell spaces of the partitioning member with a liquid dispersion containing magnetic particles, squeegeeing the liquid dispersion protruding from cell spaces of the partitioning member, and bonding an inner surface of an outer periphery of a back panel sheet and an inner surface of an outer periphery of the front panel sheet together so as to seal the liquid dispersion filled at the insides of the cell spaces.

The second process of production of the present invention preferably further comprises the steps of:

preparing as the liquid dispersion at least a first liquid dispersion containing first colored magnetic particles and a second liquid dispersion containing second colored magnetic particles colored different from the first colored magnetic particles, masking by a first masking member the cells other than selected specific cells in the cells formed by partitioning by the partitioning member and filling only the insides of the selected specific cells with the first liquid dispersion, squeegeeing the liquid dispersion from the top of the first masking member, removing the first masking member, masking by a second masking member cells other than selected specific cells in the cells not filled with the first liquid dispersion and filling only the insides of the selected specific cells not masked by the second masking member with the second liquid dispersion, and squeegeeing the liquid dispersion from the top of the second masking member.

Further, the second process of production of the present invention is preferably one in which the partitioning member is comprised of a honeycomb structure and is supplied with the honeycomb structure in a compact state and further comprises the steps of:

opening up the compact honeycomb structure so as to open up the cell spaces, coating a solidifying agent on the honeycomb structure in the state with the cell spaces opened up, and attaching the honeycomb structure coated with the solidifying agent to the depression of the front panel sheet.

The masking member is not particularly limited and may be a masking tape, masking sheet, printing screen, metal mask, etc. The material of the masking member is not particular limited and may for example be a metal, synthetic resin, fiber, etc.

Further, the squeeging tool used for the squeegeeing operation is not particularly limited and may be an elastic wiping blade comprised of rubber or a synthetic resin, a metal squeegeeing blade, etc.

Further, the squeegeeing speed of the wiping tool is not particularly limited, but preferably is 10 to 300 mm/sec, more preferably 30 to 100 mm/sec. At such a squeegeeing speed, it is possible to obtain an excellent squeegeeing effect.

Further, at the pressing force of the squeegeeing tool on the partitioning member at the time of squeegeeing is not particularly limited, but preferably is 10 to 200 $g/mm^2$, more preferably 50 to 150 $g/mm^2$. If the pressing force is too small, the squeegeeing effect is lost, while if the pressing force is too large, the partitioning member tends to be damaged.

In the second process of production according to the present invention, by filling the insides of the cell spaces of a partitioning member attached to a depression of a transparent front panel with a liquid dispersion containing magnetic particles and then wiping away the liquid dispersion protruding from the cell spaces of the partitioning member, it is possible to eliminate the excess or shortage of liquid dispersion in the individual cells and as a result eliminate breaks in display at the boundary portions of the individual cells and improve the contrast.

Further, in this aspect of the present invention, by masking by a masking member the cells other than selected specific cells in the cells formed by partitioning by the partitioning member attached to a depression of a transparent front panel, filling only the insides of the selected specific cells with a liquid dispersion containing specific colored magnetic particles, then wiping the top of the masking member and repeating this operation for each of the colored magnetic particles, it is possible to eliminate excess or shortage of liquid dispersion in the individual cells and as a result eliminate image breaks in display at the boundary portions of the individual cells, eliminate color bleeding, and improve the clearness of the hues and the resolution of the color display image.

The applications of the magnetophoresis type display device (including magnetophoresis type color display device) according to the present invention are not particularly limited. The device may be broadly used for toys for children, teaching materials, practice writing boards, game boards, record boards, memo boards, blackboards, whiteboards, advertising boards, portable memo pads, etc. The locations of installation of the magnetophoresis type display device according to the present invention are also not particularly limited. They are not limited to the insides of factories, schools, and other buildings and may also be outdoors at train platforms, ticketing gates, construction sites, etc. or in the water etc.

BRIEF DESCRIPTION OF THE DRAWINGS

These and other objects and features of the present invention will become clearer from the following explanation of the preferred embodiments given with reference to the attached drawings, in which:

FIGS. 11A to 11D are schematic views of the standards for evaluation in the examples of the present invention.

DESCRIPTION OF THE PREFERRED EMBODIMENTS

First Embodiment

Figure 1:
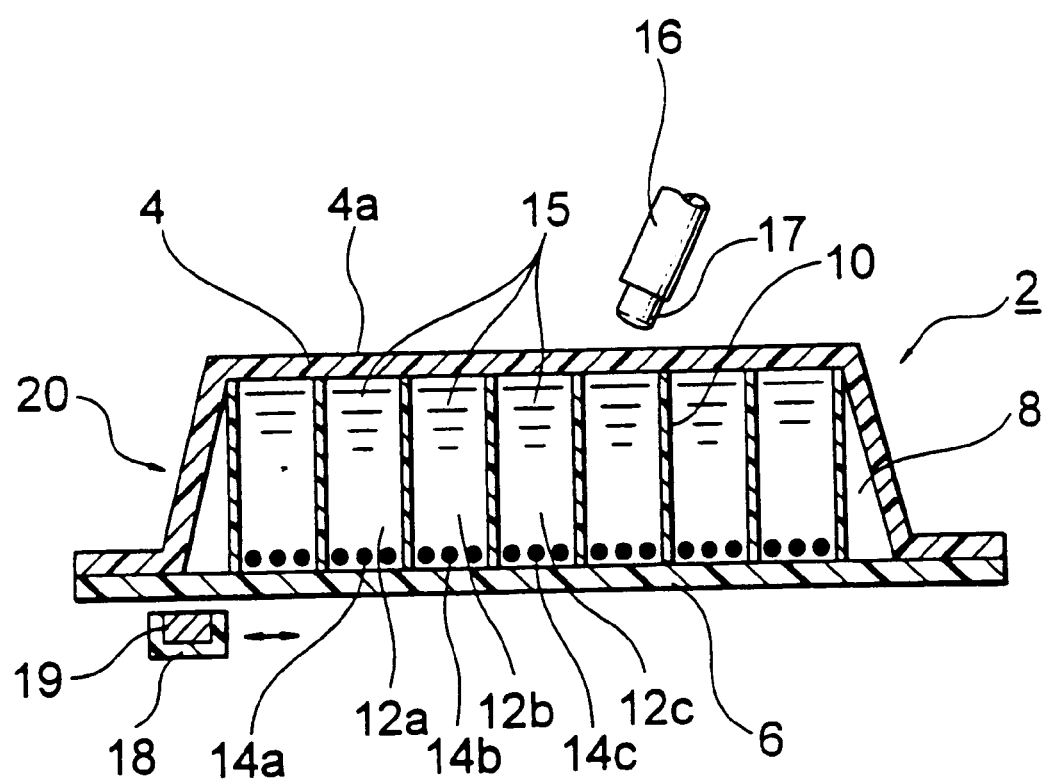
FIG. 1 is a sectional view of a magnetophoresis type display device according to a first embodiment of the present invention.

As shown in FIG. 1, a magnetophoresis type display device 2 according to a first embodiment of the present invention is provided with at least a magnetic display panel 20, a recording magnetic pen 16 serving as the recording magnetic member, and an erasing magnetic lever 18 serving as an erasing magnetic member.

The magnetic display panel 20 is comprised of a front panel sheet 4 and a back panel sheet 6. The outer peripheries of the sheets 4 and 6 are heat bonded or adhered to each other. A sealed space 8 is formed between the sheets 4 and 6. The sealed space 8 has arranged in it a honeycomb structure 10 serving as the partitioning member. As shown in FIG. 3, the honeycomb structure 10 has a large number of substantially regular hexagonal tubular cell spaces 15. As shown in FIG. 1, the insides of the cell spaces 15 sandwiched between the sheets 4 and 6 are filled with a liquid dispersion 12 containing magnetic particles 14. Each of the cell spaces 15 sealed with the liquid dispersion 12 containing the magnetic particles 14 constitutes one display cell 30 shown in FIG. 2.

In this magnetophoresis type display device 2, by sliding the tip of the magnetic pen 16 on the screen 4a formed by the surface of the display panel sheet 4, a magnetic field acts on the magnetic particles 14 in the display cells 30 corresponding to the path of movement of the magnetic pen 16, magnetophoresis of the magnetic particles 14 occurs inside the cells 30, and a display is formed at the screen 4a. For erasing the display at the screen 4a, the magnetic lever 18 is made to move along the bottom of the magnetic panel 20 thereby erasing the display on the screen 4a of the magnetic panel 20.

The tip of the magnetic pen 16 holds a permanent magnet. The magnetic lever 18 also holds a permanent magnet. The magnetic pen 16 is not connected to the magnetic display panel 20 and is supplied as a separate member. The magnetic lever 18 is arranged connected to the magnetic display panel in advance so as to be able to move along the outer surface of the back panel sheet 6. The magnetic lever 18 may be operated manually by the operator, but may also be operated automatically by connection of the magnetic lever to a motor actuator or other drive device and depression of an operating button etc.

Note that while not shown in FIG. 1, the outer periphery and back of the magnetic display panel 20 are preferably covered by a synthetic resin casing etc. for protection. The magnetic lever 18 preferably is connected to the casing to be able to move. The casing is formed with an opening through which the screen 4a of the magnetic display panel 20 is exposed.

The magnet 17 of the recording magnetic pen 16 has a magnetic force of an extent giving an effective magnetic flux density of 100 to 300 Gauss at the outer surface of the back panel sheet 6 in the state when the magnet 17 of the magnetic pen 16 is brought into contact with the outer surface of the front panel sheet 4. Further, the magnet 19 of the erasing magnetic lever 18 has a magnetic force of an extent giving an effective magnetic flux density of 100 to 300 Gauss at the outer surface of the front panel sheet 4 in the state when the magnet 19 of the magnetic lever 18 is brought into contact with the outer surface of the back panel sheet 6.

When the magnetic force of the magnet 17 of the recording magnetic pen 16 or the magnet 19 of the erasing magnetic lever 18 is too small, the magnetophoresis action in the cells 30 is weak, so the display/erasure at the screen 4a tends to become difficult. Further, when the magnetic force is too large, the magnetic field is too strong, so even magnetic particles 14 which should originally not be made to magnetically float end up magnetically floating and detract from the resolution of the displayed object at the screen 4a.

The material of the magnets 17 and 19 is not particularly limited. Any known one may be used. For example, it is possible to select from magnets comprised of ferrite powder (magnetoplumbite type ferrite), magnets comprised of metal powder (Nd, Sm, Co, Fe, Ni, and others alone or in alloys), and magnets formed by adding rubber or a resin to these materials.

In the display panel 20 of the display device 2 according to this embodiment, the front panel sheet 4 is comprised of a transparent sheet and forms the panel screen 4a at its outer surface. The material of the front panel sheet 4 is not particularly limited so long as it is transparent, but preferably is a synthetic resin with superior durability such as polyvinyl chloride, polyethylene terephthalate (PET), polyester, polyethylene, etc. The thickness of the front panel sheet 4 is not particularly limited, but preferably is 0.10 to 0.50 mm, more preferably 0.15 to 0.25 mm. If the thickness of the front panel sheet 4 is too small, the durability of it to wear by the magnetic pen 16 tends to decline, while if the thickness is too large, the material is wasted. Note that the front panel sheet 4 may also be a multilayer sheet.

The back panel sheet 6 does not necessarily have to be transparent. Its material is not particularly limited, but for example may be polyvinyl chloride, polyethylene terephthalate, polyester, polyethylene, or another synthetic resin. The thickness of the back panel sheet 6 is not particularly limited, but preferably is 0.05 to 0.30 mm, more preferably 0.10 to 0.20 mm. If the thickness of the back panel sheet 6 is too small, the durability tends to decline, while if the thickness is too large, the material is wasted. The back panel sheet 6 may also be comprised of a multilayer sheet.

The honeycomb structure 10 shown in FIG. 3 is for example comprised of a special paper having water resistance or polyester, polyvinyl chloride, acryl, or another synthetic resin. The cross sectional area of the substantially regular hexagonal shape of the cell spaces 15 in the honeycomb structure 10 is not particularly limited, but preferably is 1.0 to 5.0 mm$^2$, more preferably 2.0 to 3.0 mm$^2$. The smaller the cross sectional area, the finer the display definition that can be obtained, but if too small, smooth magnetophoresis of the magnetic particles 14 at the cells 30 tends to become difficult, while if too large, fine display definition tends to become difficult. In this embodiment, such a honeycomb structure 10 is used to enable an increase of the resolution of the displayed object at the screen 4*a* and due to the superior strength as well.

The thickness of the partitions partitioning the cell spaces 15 in the honeycomb structure 10 is not particularly limited, but preferably is 0.01 to 0.5 mm, more preferably 0.03 to 0.1 mm. The thickness of the partitions is preferably thinner from the perspective of eliminating image breaks in the display at the screen 4*a*, but if too thin, the strength tends to decline.

Figure 2:
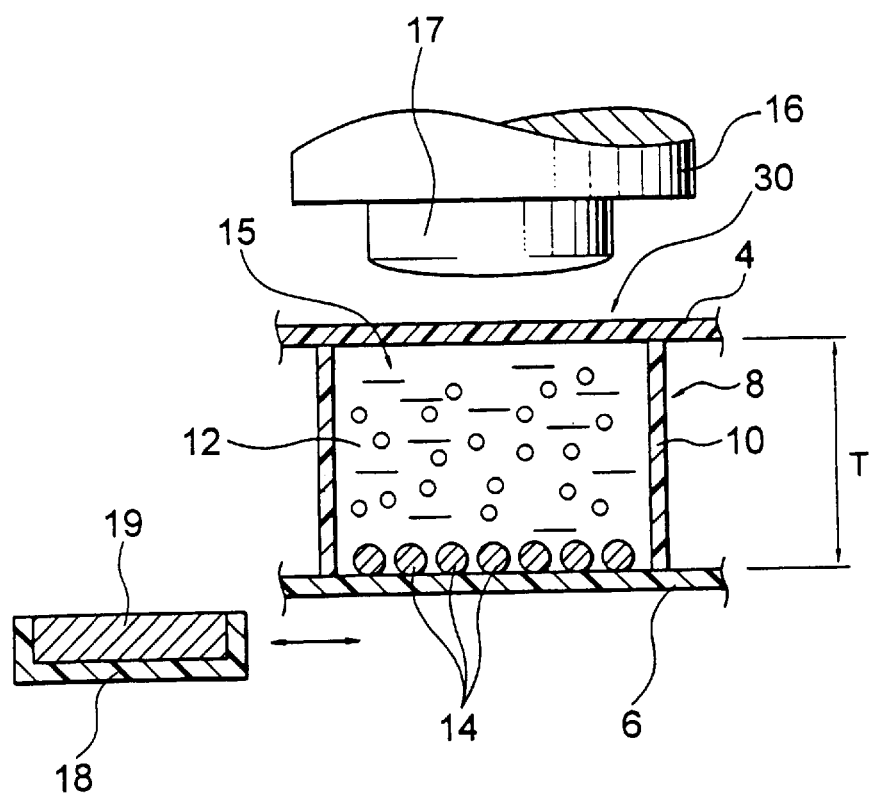
FIG. 2 is an enlarged sectional view of a part corresponding to a unit cell of the magnetophoresis type display device.
Figure 3:
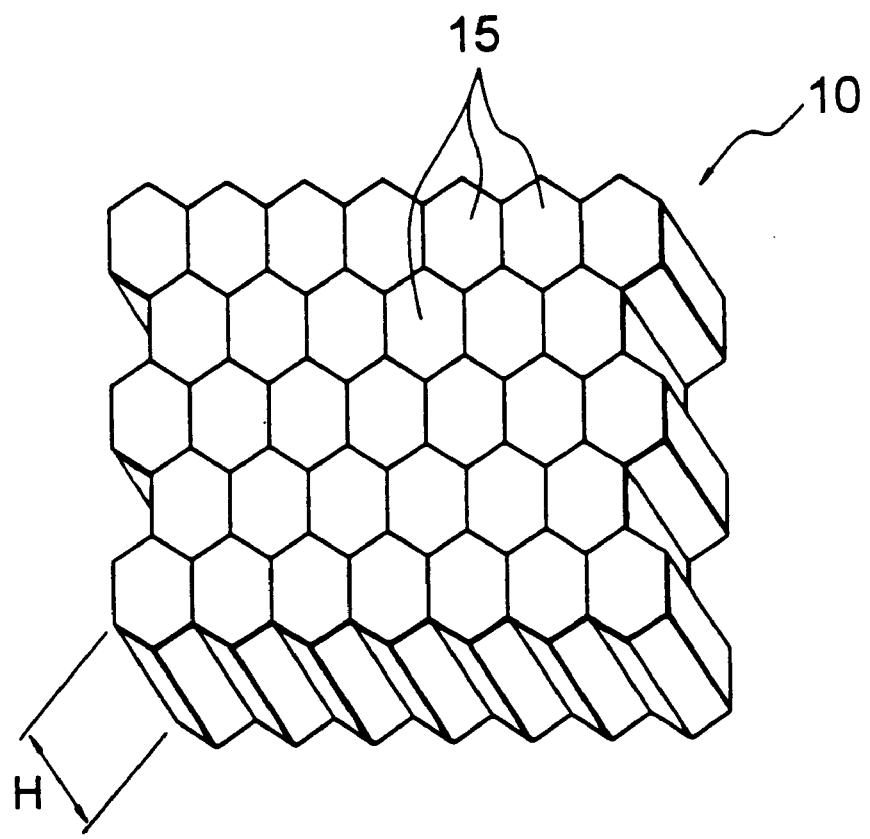
FIG. 3 is a perspective view of a honeycomb structure of a partitioning member.

The height H (see FIG. 3) of the honeycomb structure 10 corresponds to the thickness T of the sealed space 8 shown in FIG. 2. In this embodiment, the thickness T is 0.8 to 1.5 mm. If the thickness is too small, it becomes necessary to adjust the whiteness of the white fluid for concealing the hue of the magnetic particles 14 in the cells 30 by including more white particles in the white fluid. As a result, the viscosity of the white fluid will become high-preventing smooth magnetophoresis of the magnetic particles 14 and necessitating an increase in the magnetic flux density of the magnets 17 or 19 at the magnetic pen 16 or magnetic lever 18.

Further, if the thickness of the sealed space T is too large, in order to make the magnetic particles 14 sufficiently magnetically float to the front panel sheet 4 side or the back panel sheet 6 side in the cells 30, since the magnetophoresis distance is long, it is necessary to increase the magnetic flux density of the magnets 17 or 19 of the magnetic pen 16 or magnetic lever 18. Further, the magnets 17 or 19 end up becoming higher in cost. Further, the resolution of the displayed object displayed at the screen 4*a* of the display device tends to end up deteriorating.

As shown in FIG. 2, the liquid dispersion 12 sealed in the insides of the individual cells 30 is comprised of a white fluid in which magnetic particles 14 are dispersed. The white fluid contains at least a white pigment (including dyes) and a dispersion medium. The white pigment is not particularly limited, but may include for example titanium oxide, alumina, zinc oxide, silica (silicon oxide), barium titanate, barium zirconate, etc. In this embodiment, titanium oxide, alumina, zinc oxide, silica, etc. are preferably used. Further, the dispersion medium is not particularly limited and may include for example water, glycol, or another polar dispersion medium, an organic solvent, oil, or other nonpolar dispersion medium, etc. In this embodiment, preferably a paraffin (in particular isoparaffin) is used.

In this embodiment, when the total weight of the white fluid is 100 wt %, the wt % of the titanium oxide in the white fluid is C, and the wt % of the silicon oxide is D, the weight ratio C/D is in the relationship of $1 \leq C/D \leq 2.5$ and $3.0 \text{ wt} \% \leq C+D \leq 6.0 \text{ wt} \%$. If C/D is too small, the viscosity of the white fluid becomes high—preventing smooth magnetophoresis of the magnetic particles 14 and necessitating an increase in the magnetic flux density of the magnets 17, 19 attached to the magnetic pen 16 or the magnetic lever 18. Further, the resolution of the displayed object displayed at the screen 4*a* of the magnetic display panel 20 tends to end up deteriorating.

If C/D is too large, when the magnetic display panel 20 is left standing, the white fluid will tend to end up separating into a dispersion medium (paraffin etc.) layer and oxide (titanium oxide, silicon oxide, etc.) layer in a short time, which will make it impossible to display the color of the magnetic particles clearly at the screen 4*a*.

In this embodiment, the magnetic particles 14 contain 60 to 90 wt % of a magnetic material and 10 to 40 wt % of a synthetic resin and/or coloring agent. Such magnetic particles are used to hinder image breaks in display at the boundary portions of the individual cells 30 at the screen 4*a* and improve the display quality.

The material of the magnetic material in the magnetic particles 14 is selected from materials giving a magnetization of the magnetic particles 14 of at least 8.0 emu/g when a magnetic field of 200 Oe is applied to the magnetic particles 14 and giving a magnetization of the magnetic particles 14 of at least 20.0 emu/g when a magnetic field of 500 Oe is applied to the magnetic particles. The material of the magnetic material is not particularly limited, but may include for example black magnetite, chromium dioxide, ferrite (spiral type ferrite, magnetoplumbite type ferrite), and other oxide magnetic materials or cobalt, iron, copper, nickel, or their alloys or other metal magnetic materials, preferably metal magnetic materials.

The magnetic particles 14 must have a magnetization of an extent enabling magnetophoresis under the action of the low magnetic field of the recording magnetic pen 16 or erasing magnetic lever 18. By giving such a range of magnetization, the magnetic particles 14 sufficiently magnetically float and the display and/or erasing action at the screen 4*a* of the display device is improved.

As the synthetic resin including in the magnetic particles 14, any known ones may be used. For example, it is possible to select it from styrene-based, polyester-based, acryl-based, epoxy-based, and other resins. Further, as the coloring agent, it is possible to use known inorganic or organic pigments in accordance with the hue to be colored. For example, when making the magnetic particles 14 black, carbon black is used.

Note that the synthetic resin and/or coloring agent at the magnetic particles 14 preferably comprises a coating layer coating the magnetic material powder. When the magnetic material powder is not coated by a coating layer, its resistance to wear declines which tends to cause coloring of the screen. Further, the magnetic particles 14 must not form blocks in the liquid dispersion 12, so the types of the synthetic resin and/or coloring agent are selected from ones not causing their softening or swelling etc. in the liquid dispersion. It is possible to use synthetic resins which are partially cross-linked by a cross-linking agent (for example, a urethane modifier) etc.

In the present embodiment, the mean particle size of the magnetic particles 14 is 50 to 200 μm. The magnetic particles 14 may be spherical or may be irregular shapes other than spheres and can be obtained by ordinary manufacturing processes of the related art. For example, a composition comprised of the aforementioned synthetic resin and/or coloring agent and magnetic material may be melted and mixed, then pulverized and classified by air force to obtain 50 to 200 μm magnetic particles. Alternatively, a similar composition may be mixed into a solvent and then the mixture dried and the result classified to obtain 50 to 200 μm magnetic particles. By using magnetic particles 14 of such a particle size, the resolution at the screen 4a of the magnetic display panel 20 is improved and also the cause of contamination of the white fluid is eliminated and the display quality is improved.

In this embodiment, the liquid dispersion 12 to be sealed in the individual cells 30 contains 80 to 90 wt % of a white fluid and 10 to 20 wt % of the magnetic particles 14. If the ratio of content of the magnetic particles 14 in the liquid dispersion is too low, the amount of the magnetic particles 14 is too small and therefore the resolution of the displayed object at the screen 4a of the display device tends to end up deteriorating. For example, lines or letters will become thinner and may be broken in the middle. Further, if the ratio of content of the magnetic particles 14 is too high, the density of the displayed object at the screen 4a of the display device can be made high, but the white fluid will easily be contaminated and therefore the whiteness of the screen 4a will become weaker at the time of erasure and the contrast will be reduced.

Second Embodiment

Magnetophoresis Type Color Display Device

Figure 4:
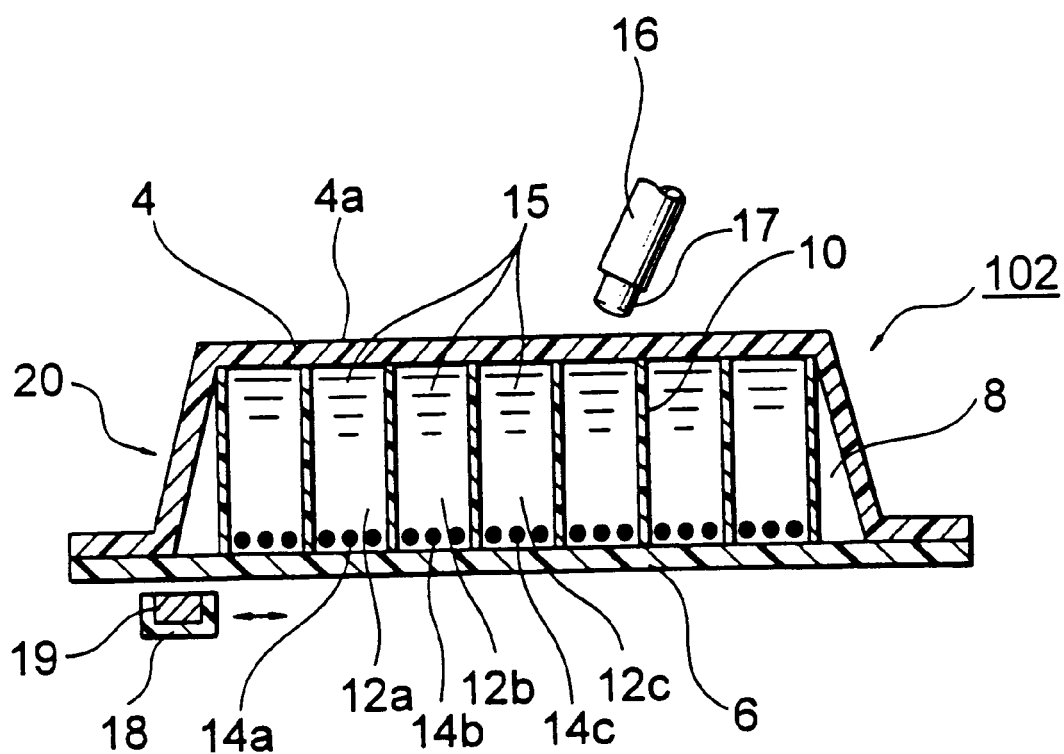
FIG. 4 is a sectional view of a magnetophoresis type color display device according to another embodiment of the present invention.

As shown in FIG. 4, the magnetophoresis type color display device 102 according to the second embodiment of the present invention is structured the same as the magnetophoresis type display device 2 according to the above first embodiment except where explained below. In the following explanation, only the portions different from the magnetophoresis type display device 2 according to the first embodiment will be explained in detail. Portions the same in the drawings will be given the same reference numerals and will not be explained.

In the magnetophoresis type color display device 102 of this embodiment, the cell spaces 15 of the magnetic display panel 120 have sealed inside them either a first liquid dispersion 12a containing first colored magnetic particles 14a, a second liquid dispersion 12b containing second colored magnetic particles 14b, or a third liquid dispersion 12c containing third colored magnetic particles 14c. Any liquid dispersions 12a to 12c may be sealed in any of the cell spaces 15, but it is preferable to use the later explained method to divide the large number of cell spaces 15 constituting the screen into for example three types of blocks and seal different liquid dispersions 12a to 12c in the blocks. Each of the cell spaces 15 sealed with the liquid dispersion 12a, 12b, or 12c constitutes a single display cell 30 shown in FIG. 5.

In this magnetophoresis type color display device 102, by sliding the tip of the magnetic pen 16 on the screen 4a formed by the surface of the display panel sheet 4, a magnetic field acts on the colored magnetic particles 14a to 14c in the display cells 30 corresponding to the path of movement of the magnetic pen 16, magnetophoresis of the colored magnetic particles 14a to 14c occurs inside the cells 30, and a color display is formed at the screen 4a. For erasing the display at the screen 4a, the magnetic lever 18 is made to move along the bottom of the magnetic display panel 20 thereby erasing the color display on the screen 4a of the magnetic display panel 20.

The tip of the magnetic pen 16 holds a permanent magnet. The magnetic lever 18 also holds a permanent magnet. The magnetic pen 16 is not connected to the magnetic display panel 20 and is supplied as a separate member. The magnetic lever 18 is arranged connected to the magnetic display panel in advance so as to be able to move along the outer surface of the back panel sheet 6. The magnetic lever 18 may be operated manually by the operator, but may also be operated automatically by connection of the magnetic lever to a motor actuator or other drive device and depression of an operating button etc.

The magnet 17 of the recording magnetic pen 16 has a magnetic force of an extent giving an effective magnetic flux density of 100 to 500 Gauss at the outer surface of the back panel sheet 6 in the state when the magnet 17 of the magnetic pen 16 is brought into contact with the outer surface of the front panel sheet 4. Further, the magnet 19 of the erasing magnetic lever 18 has a magnetic force of an extent giving an effective magnetic flux density of 300 to 1500 Gauss at the outer surface of the front panel sheet 4 in the state when the magnet 19 of the magnetic lever 18 is brought into contact with the outer surface of the back panel sheet 6.

When the magnetic force of the magnet 17 of the recording magnetic pen 16 is too small, the magnetophoresis action in the cells 30 is weak, so the color display at the screen 4a is difficult. Further, when the magnetic force of the magnet 17 of the recording magnetic pen 16 is too large, the magnetic field is too strong, so the resolution of the color displayed object tends to be detracted from when the magnetically floating colored magnetic particles 14a to 14c are displayed at the panel screen 4a.

Further, if the magnetic force of the magnet 19 of the erasing magnetic lever 18 is too small, the magnetophoresis action in the cells 30 is weak, it becomes difficult to pull back the colored magnetic particles 14a to 14c from the panel screen 4a side, and the erasure of the displayed object at the screen 4a tends to become difficult. Further, if the magnetic force of the magnet 19 of the erasing magnetic lever 18 is too large, the magnetic field is too strong, so the colored magnetic particles 14a to 14c magnetically floating for erasure remain at the inner surface of the panel screen as "stubble" and therefore the display of the panel screen 4a cannot be cleanly erased.

The material of the magnets 17 and 19 is not particularly limited. Any known one may be used. For example, it is possible to select from magnets comprised of ferrite powder (magnetoplumbite type ferrite), magnets comprised of metal powder (Nd, Sm, Co, Fe, Ni, and others alone or in alloys), and magnets formed by adding rubber or a resin to these materials.

In the display panel 20 of the display device 102 according to this embodiment, the front panel sheet 4 is comprised of a transparent sheet and forms the panel screen 4a at its outer surface. The material of the front panel sheet 4 is polyethylene terephthalate in this embodiment. A magnetic display panel 20 having a front panel sheet 4 comprised of polyethylene terephthalate is easier to dispose of and is environmentally friendly. Further, the contrast at the screen is improved by making the front panel sheet polyethylene terephthalate.

The thickness of the front panel sheet 4 is not particularly limited, but preferably is 0.10 to 0.50 mm, more preferably 0.15 to 0.25 mm. If the thickness of the front panel sheet 4 is too small, the durability of it to wear by the magnetic pen 16 tends to decline, while if the thickness is too large, the material is wasted. Note that the front panel sheet 4 may also be a multilayer sheet.

The back panel sheet 6 does not necessarily have to be transparent. Its material is not particularly limited, but for example may be polyvinyl chloride, polyethylene terephthalate (PET), polyester, polyethylene, or another synthetic resin, but preferably is PET. The thickness of the back panel sheet 6 is not particularly limited, but preferably is 0.05 to 0.30 mm, more preferably 0.10 to 0.20 mm. If the thickness of the back panel sheet 6 is too small, the durability tends to decline, while if the thickness is too large, the material is wasted. The back panel sheet 6 may also be comprised of a multilayer sheet.

The honeycomb structure 10 is comprised of a special paper having water resistance (paper coated with a resin). The cross sectional area of the substantially regular hexagonal shape of the cell spaces 15 in the honeycomb structure 10 is not particularly limited, but preferably is 1.0 to 5.0 mm$^2$, more preferably 2.0 to 3.0 mm$^2$. The smaller the cross sectional area, the finer the display definition that can be obtained, but if too small, smooth magnetophoresis of the colored magnetic particles 14 at the cells 30 tends to become difficult, while if too large, fine display definition tends to become difficult. In this embodiment, such a honeycomb structure 10 is used to enable an increase of the resolution of the displayed object at the screen 4a and due to the superior strength as well. Further, by making the honeycomb structure 10 by paper, disposal of the magnetic display panel 20 becomes easy. The process of production of the honeycomb structure will be explained later.

The thickness of the partitions partitioning the cell spaces 15 in the honeycomb structure 10 is not particularly limited, but preferably is 0.01 to 0.5 mm, more preferably 0.03 to 0.1 mm. The thickness of the partitions is preferably thinner from the perspective of eliminating breaks in the display at the screen 4a, but if too thin, the strength tends to decline.

Figure 5:
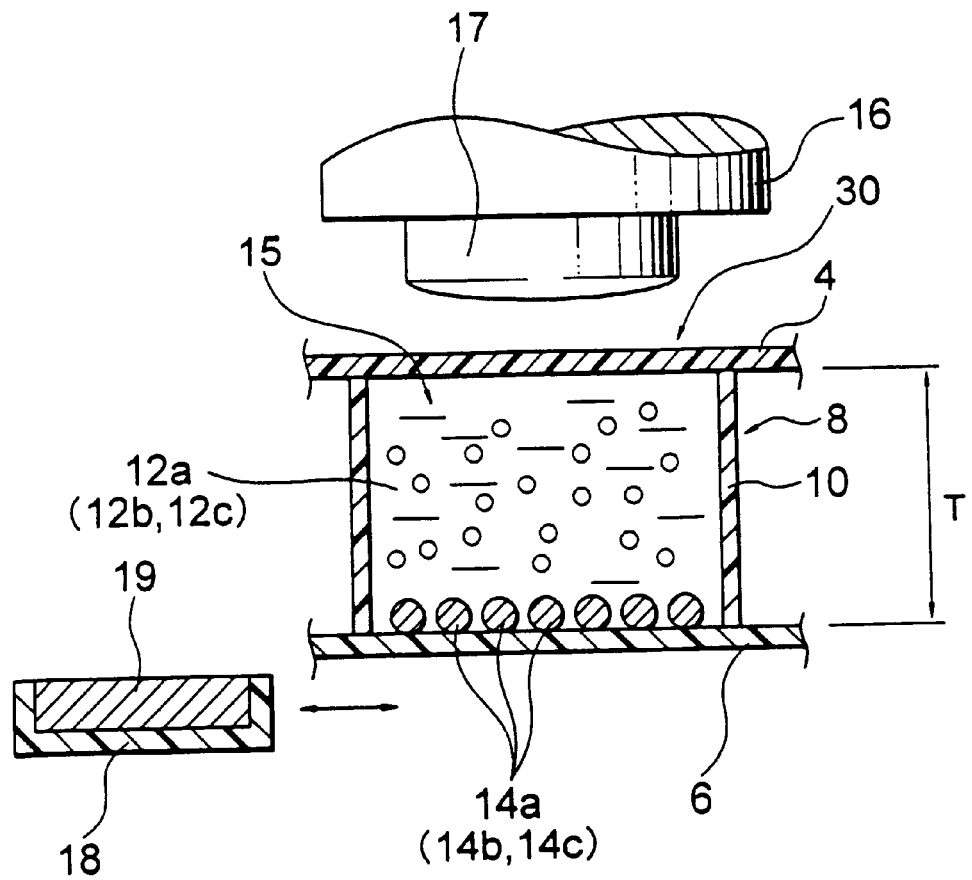
FIG. 5 is an enlarged sectional view of a part corresponding to a unit cell of the magnetophoresis type color display device.

The height H (see FIG. 3) of the honeycomb structure 10 corresponds to the thickness T of the sealed space 8 (cell spaces 15) shown in FIG. 5. In this embodiment, the thickness T is 0.8 to 1.5 mm. If the thickness is too small, it becomes necessary to adjust the whiteness of the white fluid for concealing the hue of the colored magnetic particles 14a to 14c in the cells 30 by including more white particles in the white fluid. As a result, the viscosity of the white fluid will become high preventing smooth magnetophoresis of the colored magnetic particles 14a to 14c and necessitating an increase in the magnetic flux density of the magnets 17 or 19 at the magnetic pen 16 or magnetic lever 18. Further, this tends to have a detrimental effect on the resolution and hues of the displayed object displayed on the screen 4a of the display device.

Further, if the thickness of the sealed space T is too large, in order to make the colored magnetic particles 14a to 14c sufficiently magnetically float to the front panel sheet 4 side or the back panel sheet 6 side in the cells 30, since the magnetophoresis distance is long, it is necessary to increase the magnetic flux density of the magnets 17 or 19 of the magnetic pen 16 or magnetic lever 18. Further, the magnets 17 or 19 end up becoming higher in cost.

As shown in FIG. 5, the liquid dispersions 12a to 12c sealed in the insides of the individual cells 30 are comprised of a white fluid in which colored magnetic particles 14a to 14c are dispersed. The white fluid contains at least a white pigment (including dyes) and a dispersion medium. The white pigment is not particularly limited, but may include for example titanium oxide, alumina, zinc oxide, silica, barium titanate, barium zirconate, etc. In this embodiment, titanium oxide ($TiO_2$), alumina ($Al_2O_3$), zinc oxide (ZnO), silica (silicon oxide or $SiO_2$), and other white inorganic oxides are preferably used. Further, the dispersion medium is not particularly limited and may include for example water, glycol, or another polar dispersion medium, an organic solvent, oil, or other nonpolar dispersion medium, etc. In this embodiment, preferably a paraffin (in particular isoparaffin) is used.

In this embodiment, when the total weight of the white fluid is 100 wt %, the wt % of the isoparaffin in the white fluid is A, and the wt % of the mixture of the white inorganic oxides is B, the weight ratio A/B is in the relationship of $10 \leq A/B \leq 20$.

If the weight ratio A/B is too large, the whiteness of the white fluid will become weak and will tend not to be able to completely erase the color of the colored magnetic particles 14a to 14c from the panel screen 4a and the panel screen 4a will appear dirty. Further, if A/B is too small, the whiteness of the white fluid will end up concealing the hues of the colored magnetic particles 14a to 14c resulting in the inability to obtain a clear hue display.

Further, in this embodiment, the viscosity of the white fluid is 200 to 800 cp at 25° C. If the viscosity of the white fluid is too low, the magnetic particles displayed at the panel top surface will not be able to be held. Further, if the viscosity of the white fluid is too high, this will prevent smooth magnetophoresis of the colored magnetic particles 14a to 14c and necessitate an increase in the magnetic flux density of the magnet 17 or 19 or the recording magnetic pen 16 or erasing magnetic lever 18.

In this embodiment, the colored magnetic particles 14a to 14c contained in the white fluid in the liquid dispersions 12a to 12c are not particularly limited so long as they are colored differently. Various colored particles may be used. For example, as the colored magnetic particles 14a to 14c, it is possible to use particles comprised of ferrite powder, metal powder, or other magnetic materials coated on their outer peripheries with a synthetic resin or coloring agent.

The material of the magnetic material in the colored magnetic particles 14a to 14c is selected from materials giving a magnetization of the colored magnetic particles 14a to 14c of at least 20.0 emu/g when a magnetic field of 500 Oe is applied to the colored magnetic particles 14a to 14c. The material of the magnetic material is not particularly limited, but may include for example black magnetite, chromium dioxide, ferrite (spiral type ferrite, magnetoplumbite type ferrite), and other oxide magnetic materials or cobalt, iron, copper, nickel, or their alloys or other metal magnetic materials, preferably metal magnetic materials.

The colored magnetic particles 14a to 14c must have a magnetization of an extent enabling magnetophoresis under the action of the low magnetic field of the recording magnetic pen 16 or erasing magnetic lever 18. By giving such a range of magnetization, the colored magnetic particles 14a to 14c sufficiently magnetically float and the display and/or erasing action at the screen 4a of the display device is improved.

As the synthetic resin including in the colored magnetic particles 14a to 14c, any known ones may be used. For example, it is possible to select it from styrene-based, polyester-based, acryl-based, epoxy-based, and other resins. Further, as the coloring agent, it is possible to use known inorganic or organic pigments in accordance with the hue to be colored. For example, when making one of the colored magnetic particles 14a to 14c black, carbon black is used. Further, when making the colored magnetic particles 14a blue magnetic particles, making the colored magnetic particles 14b green magnetic particles, and making the colored magnetic particles 14c red magnetic particles, it is preferable to use the following coloring agents. That is, as the blue coloring agent, a Co—Mn-based complex oxide pigment or other coloring agent is preferable. As the green coloring agent, a Co—Mn-based complex oxide pigment or other coloring agent is preferred. As the red coloring agent, hematite or another coloring agent is preferable.

Note that the synthetic resin and/or coloring agent at the colored magnetic particles 14a to 14c preferably comprises a coating layer coating the magnetic material powder. When the magnetic material powder is not coated by a coating layer, its resistance to wear declines which tends to cause coloring of the screen. Further, the colored magnetic particles 14a to 14c must not form blocks in the liquid dispersions 12a to 12c, so the types of the synthetic resin and/or coloring agent are selected from ones not causing their softening or swelling etc. in the liquid dispersions. It is possible to use synthetic resins which are partially cross-linked by a cross-linking agent (for example, a urethane modifier) etc.

In the present embodiment, the weight ratio between the magnetic material in the colored magnetic particles 14a to 14c and the synthetic resin and/or coloring agent differs depending on the hue etc. of the particles 14a to 14c, but generally a weight ratio of 60 to 90 wt % of magnetic material and 10 to 40 wt % of the synthetic resin and/or coloring agent is preferable. In the present embodiment, the mean particle size of the colored magnetic particles 14a to 14c is 50 to 200 μm. The colored magnetic particles 14a to 14c may be spherical or may be irregular shapes other than spheres and can be obtained by ordinary manufacturing processes of the related art. For example, a composition comprised of the afore-mentioned synthetic resin and/or coloring agent and magnetic material may be melted and mixed, then pulverized and classified by air force to obtain 50 to 200 μm magnetic particles. Alternatively, a similar composition may be mixed into a solvent and then the mixture dried and the result classified to obtain 50 to 200 μm magnetic particles. If the mean particle size of the colored magnetic particles is too small, the background color, that is, the white fluid, will easily be contaminated due to the effect of the colored magnetic particles 14a to 14c and the response in the magnetophoresis at the time of erasing an image display will tend to become slow. Further, if the mean particle size of the colored magnetic particles 14a to 14c is too large, while a color display will be possible, the resolution of the color display will tend to deteriorate.

In this embodiment, the ratio of mixture of the white fluid and the colored magnetic particles 14a to 14c in the liquid dispersions 12a to 12c to be sealed in the individual cells 30 differs depending on the hues of the colored magnetic particles 14a to 14c, but in general a weight ratio of 80 to 90 wt % of the white fluid and 10 to 20 wt % of the colored magnetic particles 14a to 14c is preferable. If the ratios of content of the colored magnetic particles 14a to 14c in the liquid dispersions are too low, the amounts of the colored magnetic particles 14a to 14c are too small, so the resolution of the displayed object at the screen 4a of the display device tends to end up deteriorating. For example, the lines and letters become thinner and may even break in the middle. Further, if the ratios of content of the colored magnetic particles 14a to 14c are too high, while the density of the displayed object at the screen 4a of the display device can be made high, the white fluid is easily contaminated and therefore the whiteness at the screen 4a at the time of erasure may become weaker and will tend to cause a decline in the color contrast.

Process of Production of Magnetophoresis Type Color Display Device

Figure 6A:
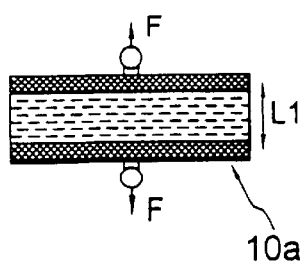
FIGS. 6A and 6B are schematic views of steps in the production of a honeycomb structure.
Figure 6B:
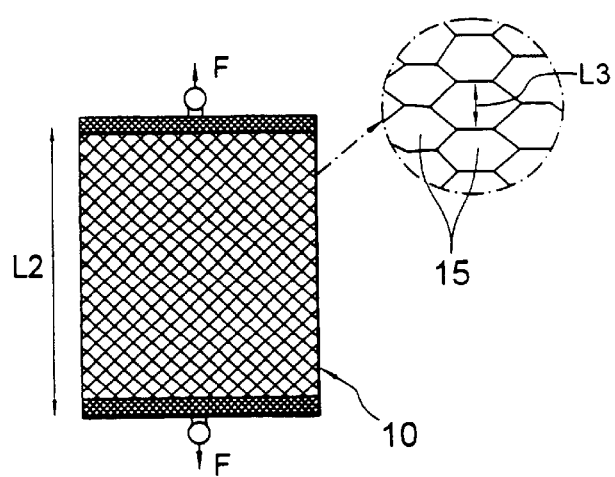
Figure 7:
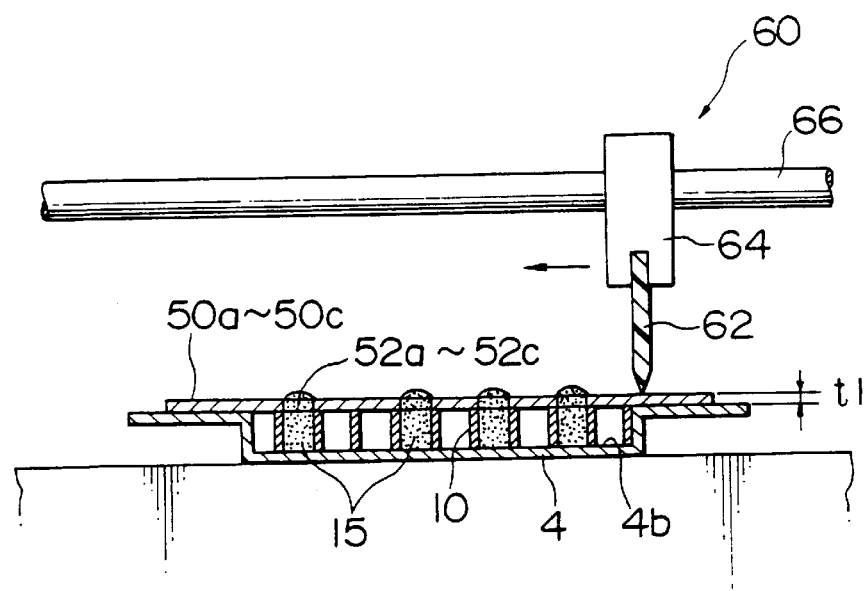
FIG. 7, FIGS. 8A to 8D, and FIG. 9 are sectional views of parts showing steps in the production of a magnetophoresis type color display device.

To produce the magnetophoresis type color display device 102 according to the present embodiment, first, as shown in FIG. 7, a honeycomb structure 10 is placed in a depression 4b of a front panel sheet 4 having that depression 4b at its inner surface and comprised of transparent PET. The honeycomb structure 10 of the present embodiment is comprised of a special paper and, as shown in FIG. 6A, is compacted in one direction to form a honeycomb preshaping block 10a in the state before attachment. Tensile force F is made to act from the two sides of the honeycomb preshaping block 10a to expand the block 10a to open up the cell spaces 15 as shown in FIG. 6B.

For example, in the block 10a state, the length L1 in one direction is preferably 3.0 to 5.0 cm, more preferably 3.5 to 4.5 cm, while the length L2 of the structure 10 after expansion is preferably 40 to 60 cm, more preferably 45 to 58 cm. Further, the open length L3 of the cell spaces 15 in the structure 10 after expansion is preferably 2.5 to 5.0 mm, more preferably 2.8 to 4.2 mm. The tensile force F for opening them up in this way changes depending on the size of the honeycomb structure 10 and is not particularly limited, but for example may be 50 to 100 gf or so. If the tensile force is too small, the cell spaces 15 tend not to be able to be opened up well, while if too large, the honeycomb structure 10 is liable to be broken.

The open length L3 of the cell spaces 15 tends to shrink along with the elapse of time along with the length L2 of the honeycomb structure 10, so in this embodiment, after the tensile force F is released (for example, after several tens of seconds), a solidifying agent is sprayed onto the honeycomb structure 10. The solidifying agent is not particularly limited so long as it is a solidifying agent which can suppress the shrinkage of the shape of the expanded honeycomb structure 10, but for example use may be made of a solidifying agent comprised of a solution of a styrene-acryl copolymer or other acryl resin dissolved in ethyl acetate. The weight ratio of the ethyl acetate and the acryl resin in the solidifying agent is not particularly limited, but preferably is 10 to 20 wt % of the acryl resin with respect to 80 to 90 wt % of the ethyl acetate. By increasing the ratio of content of the resin, the effect of suppression of shrinkage of the structure 10 can be expected to be heightened, but if the ratio of content of the resin is made too high, coating by spraying will tend to become difficult.

In the state with the cell spaces 15 opened up and the shrinkage of the honeycomb structure 10 suppressed, the honeycomb structure 10 is cut to a predetermined size. Next, as shown in FIG. 7, the cut honeycomb structure 10 is placed into and adhered to the depression 4b of the front panel sheet 4 having the depression 4b at its inside.

Next, the liquid dispersion 12a, 12b, and 12c containing the magnetic particles of the first to third colored magnetic particles 14a to 14c are filled inside the cell spaces 15 according to a predetermined rule or at random. To fill them in accordance with a predetermined rule, the method of using masking sheets or molds formed with pattern openings for predetermined colors, the method of using masking tape, or the method of using screen printing may be mentioned as examples, but in this embodiment masking sheets 50a to 50c shown in FIG. 8A to FIG. 8C are used.

Figures 8A, 8B, 8C:
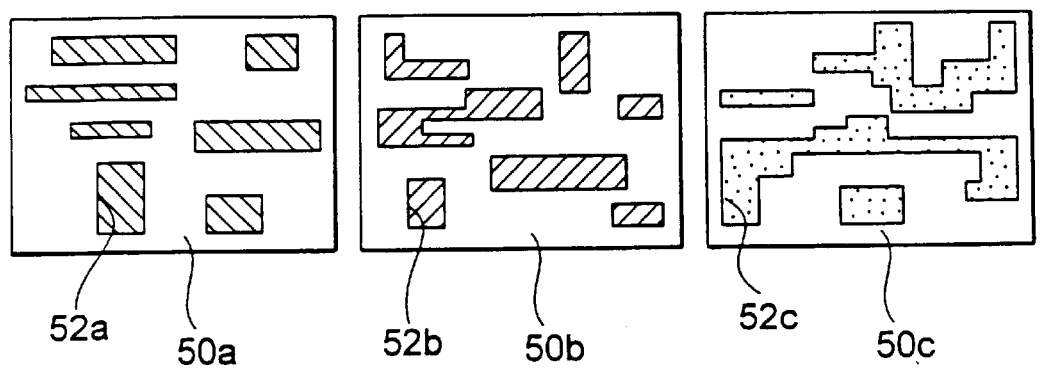

The masking sheets 50a to 50c shown in FIG. 8A to FIG. 8C are respectively formed with first coloring openings 52a, second coloring openings 52b, and third coloring openings 52c. These openings 52a to 52c may be any patterns so long as they are patterns not overlapping with each other and may be random patterns, regular patterns, picture patterns, design patterns, character goods patterns, etc.

The masking sheets 50a to 50c are comprised of synthetic resin sheets in this embodiment. The thickness t1 (see FIG. 7) of the sheets is preferably 0.05 to 1.0 mm, more preferably 0.1 to 0.2 mm. If the thickness t1 is too small, the sheets will rise up at the later explained wiping (squeegeeing) and the masking effect will tend to be small, while if the thickness t1 is too large, the liquid dispersion remaining at the openings 52a to 52c at the time of peeling off the masking sheets 50a to 50c will be liable to flow into cell spaces which they originally should not be filled into.

The masking sheets 50a to 50c, as shown in FIG. 7, must be placed positioned with respect to the honeycomb structure 10. Further, they must not move out of position from the honeycomb structure at the time of the later wiping. Therefore, in the present embodiment, tacky layers are preferably formed at the backs of the masking sheets 50a to 50c. The tackiness of the tacky layers is determined to be an extent so that the masking sheets 50a to 50c will not slip from the honeycomb structure 10 at the time of the later explained wiping and the honeycomb structure will not be damaged when the masking sheets 50a to 50c are peeled away from the honeycomb structure 10.

Note that instead of forming tacky layers at the backs of the masking sheets 50a to 50c, it is also possible to form a large number of projections. The projecting height of the projections is preferably 0.1 to 0.5 mm. By forming projections, the degree of friction between the masking sheets and the honeycomb structure rises etc. so it will become more difficult for the masking sheets 50a to 50c to slip from the honeycomb structure 10 at the time of wiping.

In the present embodiment, first, the masking sheet 50a in which the openings 52a are formed is placed positioned against the inside of the front panel sheet 4 in which the honeycomb structure 10 shown in FIG. 7 is housed. Next, the insides of the blocks of the plurality of cell spaces 15 positioned in patterns corresponding to the openings 52a of the masking sheet 50a are filled with the first liquid dispersion 12a containing the first colored magnetic particles 14a.

At the time of filling, the liquid dispersion is filled from the openings 52a of the masking sheet 50a so as to protrude somewhat. Next, a wiping device 60 is used to wipe the surface of the masking sheet 50a at least once, preferably several times.

The wiping device 60 is provided with a rubber blade 62. The blade 62 is held by a moving member 64. The moving member 64 is able to move along a rail 66. As a result, the front edge of the blade 62 can wipe the entire surface of the masking sheet 50a.

Next, the masking sheet 50a is removed and the masking sheet 50b formed with another pattern of openings 52b is placed positioned against the inside of the front panel sheet 4 in which the honeycomb structure 10 is housed. Next, the insides of the blocks of the plurality of cell spaces 15 positioned in patterns corresponding to the openings 52b of the masking sheet 50b are filled with the second liquid dispersion 12b containing the second colored magnetic particles 14b and then wiping is performed in same way as above.

Next, the masking sheet 50b is removed and the masking sheet 50c formed with another pattern of openings 52c is placed positioned against the inside of the front panel sheet 4 in which the honeycomb structure 10 is housed. Next, the insides of the blocks of the plurality of cell spaces 15 positioned in patterns corresponding to the openings 52c of the masking sheet 50c are filled with the third liquid dispersion 12c containing the third colored magnetic particles 14c and then wiping is performed in same way as above.

Figure 9:
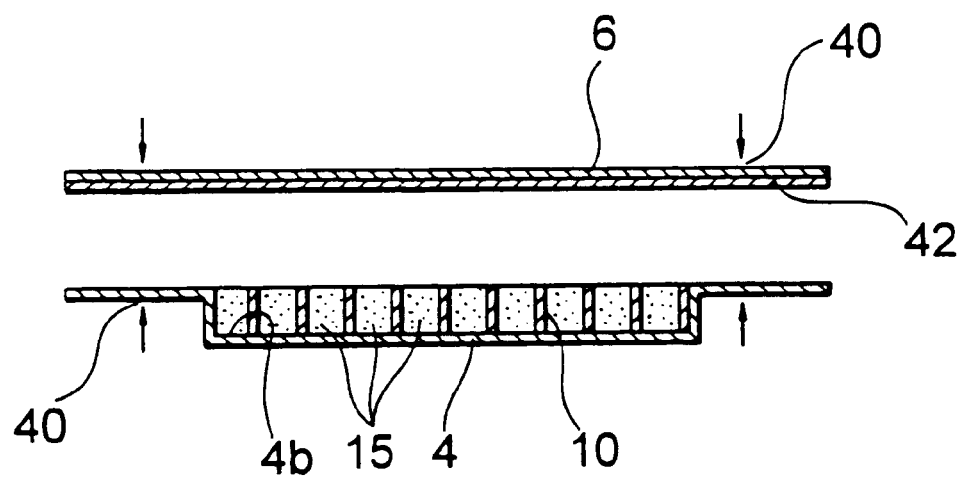

Next, the masking sheet 50c is removed and, as shown in FIG. 9, the back panel sheet 6 coated on its inner surface with an adhesive 42 is pressed against and adhered to the illustrated top surface of the honeycomb structure 10 and the inner surface of the outer periphery of the front panel sheet 4. Next, a high frequency type welder is used to heat bond part 40 of the outer periphery of the front panel sheet 4 to completely seal the inside and obtain the magnetic display panel 120 shown in FIG. 4. The conditions for the heat bonding of the high frequency type welder are not particularly limited, but preferably are a heating temperature of 80 to 110° C., more preferably 95 to 105° C., for preferably 3 to 7 seconds, more preferably 4 to 6 seconds. If the heating temperature is too low, the heat bonding of the front panel sheet 4 comprised of PET will tend to be difficult, while if the temperature is too high, there will tend to be a detrimental effect on the liquid dispersions 12a to 12c at the inside. Note that FIG. 4 and FIG. 9 show the magnetic display panel 120 reversed in direction from each other.

Figure 8D:
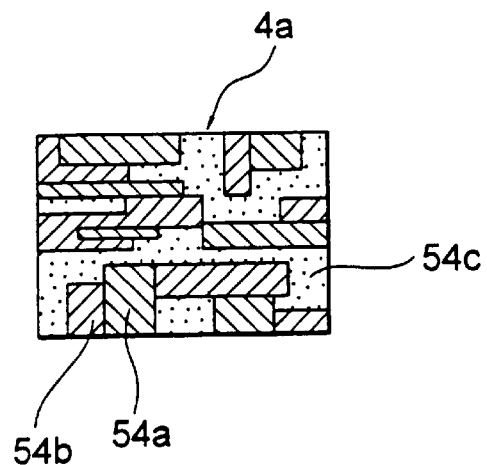

By this process, as shown in FIG. 8D, it is possible to produce a magnetophoresis type color display device 102 in which the overall screen 4a is divided into predetermined patterns of three types of blocks and in which the insides of the cell spaces 15 positioned in the blocks are filled with liquid dispersions 12a to 12c containing colored magnetic particles 14a to 14c of different hues and thereby can display a plurality of colors.

Other Embodiments

Note that the present invention is not limited to the above embodiments and can be modified in various ways within the scope of the invention.

For example, the recording magnetic member given as the recording magnetic pen 16 shown in FIG. 1 and FIG. 4 need not be completely separate from the magnetic display panel 20 and may be connected by a cord or other means. Further, the recording magnetic member given as the recording magnetic pen 16 need not be moved by hand and may be made to move automatically by an XY plotter etc.

Further, the hues of the colored magnetic particles 14a to 14c are not limited to the three primary colors and may be other hues as well. Further, the types of the colored magnetic particles are not limited to the three types. Two types or four or more types are also possible. Further, the hue of the single-color fluid serving as the background color of the liquid dispersion in which the colored magnetic particles are dispersed is not limited to white and may be other colors as well.

The present invention will be explained in more detail below with reference to detailed examples, but the present invention is of course not limited to these examples.

EXAMPLE 1

Preparation of Panel Filling

Predetermined amounts of isoparaffin, titanium oxide, silicon oxide, and alumina were prepared as in the compositions shown in the following Table 1 and were mixed by a homogenizer at 4000 rpm for 5 minutes to obtain the white fluids 1 to 5.

TABLE 1

|  | Composition (wt %) | | | | |
| --- | --- | --- | --- | --- | --- |
|  | Isoparaffin | Titanium oxide powder (C) | Silicon oxide powder (D) | Alumina powder | (C)/(D) weight ratio |
| White fluid 1 | 94.0 | 3.5 | 2.0 | 0.5 | 1.75 |
| White fluid 2 | 96.2 | 1.8 | 1.5 | 0.5 | 1.20 |
| White fluid 3 | 94.9 | 3.6 | 1.5 | 0.5 | 2.40 |
| White fluid 4* | 95.0 | 2.0 | 2.5 | 0.5 | 0.80* |
| White fluid 5* | 94.0 | 4.0 | 1.5 | 0.5 | 2.67* |

Asterisks indicate outside preferable range.

Further, these white fluids were transferred to a plurality of separate containers, added with magnetic powders 1 to 4 of the compositions and magnetic characteristics shown in the following Table 2 (corresponding to magnetic particles 14 in FIG. 1 and FIG. 2), then mixed using a mixer at 300 rpm for 1 minute to obtain the liquid dispersions serving as the panel filling. The weight ratios of the white fluids to the magnetic powders in the liquid dispersions are shown in the following Table 3.

Figure 10A:
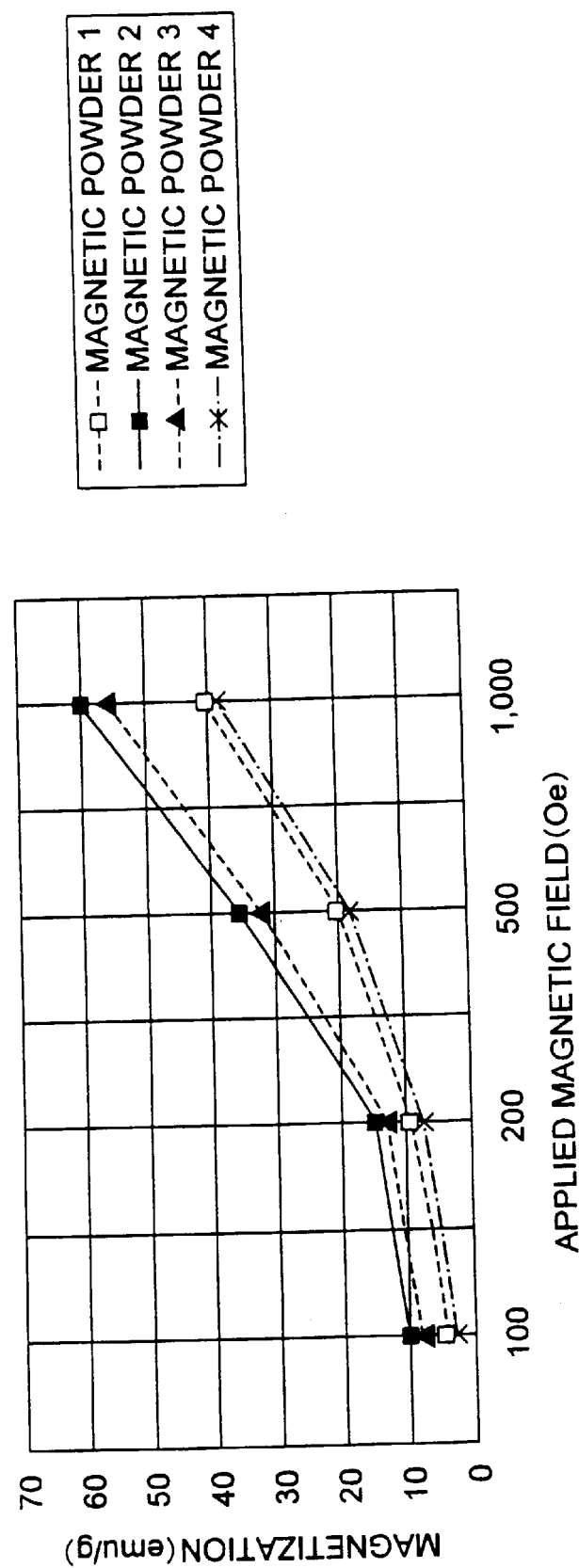
FIGS. 10A and 10B are graphs of the relationships between applied magnetic fields and magnetizations in examples of the present invention.

Note that the relationships between the applied magnetic fields and magnetizations in the magnetic powders 1 to 4 are shown in FIG. 10A.

The mean particle sizes of the magnetic powders 1 to 4 were from 100 to 120 μm. The mean particle sizes were measured by placing the magnetic powders on various sieves of mesh nos. 83 to 325, shaking them, finding the amounts of the magnetic powders remaining on the respective sieves, then calculating the mean particle sizes from the weight ratios.

TABLE 2

| Composition | | Magnetization (emu/g) | |
| --- | --- | --- | --- |
|  | [Figures in parentheses are wt %] | Applied magnetic field 200 Oe | Applied magnetic field 500 Oe |
| Magnetic powder 1 | Fe powder (65) + resin (31) + carbon black (4) | 9.2 | 20.5 |
| Magnetic powder 2 | Mn—Zn ferrite (100) | 14.2 | 34.8 |
| Magnetic powder 3 | Magnetite (90) + resin (10) | 13.1 | 32.2 |
| Magnetic powder 4* | Magnetite (65) + resin (35) | 7.6* | 19.1* |

(Oe: Oersted)

Preparation of Magnetic Display Panel

A transparent polyvinyl chloride sheet of a thickness of 0.20 mm was prepared as the front panel sheet 4 shown in FIG. 1, a transparent polyvinyl chloride sheet of a thickness of 0.10 mm was prepared as the back panel sheet 6, and special paper honeycomb structures were prepared as the honeycomb structure 10 shown in FIG. 3. The cross sectional area of the cell spaces 15 in the honeycomb structures 10 was 3.0 mm$^2$, while the thickness of the partitions partitioning the cell spaces 15 was 0.05 mm. As the honeycomb structures 10, ones having various heights H (see FIG. 3) were prepared. The heights H corresponded to the thickness T of the sealed spaces 8 shown in FIG. 2. Ones of various thicknesses were prepared as shown in the following Table 3.

One surface of each of the honeycomb structures 10 was adhered to the inner surface of a front panel sheet 4 shown in FIG. 1, then the insides of the cell spaces 15 were filled with a filling obtained at the process of preparation of the panel filling under agitation. When filling the filling, the assembly was turned upside down from FIG. 1 and the front panel sheet 4 was made to be positioned at the bottom. Next, a back panel sheet 6 comprised of a polyvinyl chloride sheet coated with an epoxy-based adhesive was pressed down and adhered to the inner surface of the outer periphery of the front panel sheet 4 and the other surface of the honeycomb structure 10 to completely seal the inside. As a result, the magnetic panels 1 to 14 shown in Table 3 (corresponding to the magnetic display panel 20 shown in FIG. 1) were obtained.

TABLE 3

| Panel material | Cell thickness (mm) | Panel filling | | | Effective magnetic flux density of magnetic pen at panel bottom (Gauss) | Effective magnetic flux density of magnetic erasure at panel surface (Gauss) | Black reflectance at panel display (%) | Resolution of display pattern | White reflectance at panel erasure (%) |
| --- | --- | --- | --- | --- | --- | --- | --- | --- | --- |
|  |  | Magnetic powder [M] | White fluid [F] | [F]/[M] weight ratio |  |  |  |  |  |
| Panel 1 | 1.0 | 1 | 1 | 85.0/15.0 | 220 | 228 | 10.5 | Good | 56.2 |
| Panel 2 | 1.0 | 2 | 2 | 90.0/10.0 | 223 | 230 | 16.1 | Good | 57.8 |
| Panel 3 | 1.0 | 3 | 3 | 80.0/20.0 | 214 | 225 | 15.6 | Good | 56.8 |
| Panel 4 | 0.8 | 1 | 1 | 85.0/15.0 | 290 | 295 | 11.2 | Good | 52.1 |
| Panel 5 | 1.5 | 2 | 3 | 85.0/15.0 | 110 | 124 | 15.8 | Good | 54.3 |
| Panel 6 | 1.0 | 2 | 1 | 82.5/17.5 | 225 | 230 | 15.2 | Good | 54.1 |
| Panel 7 | 1.0 | 1 | 3 | 87.5/12.5 | 230 | 234 | 9.8 | Good | 58.1 |
| Panel 8* | 1.5 | 4* | 1 | 85.0/15.0 | 102 | 110 | 25.5 | Poor | 56.5 |
| Panel 9* | 0.8 | 3 | 4* | 82.5/17.5 | 283 | 294 | 14.2 | Poor | 42.2 |

TABLE 3-continued

| Panel material | Cell thickness (mm) | Panel filling Magnetic powder [M] | White fluid [F] | [F]/[M] weight ratio | Effective magnetic flux density of magnetic pen at panel bottom (Gauss) | Effective magnetic flux density of erasure magnetic at panel surface (Gauss) | Black reflectance at panel display (%) | Resolution of display pattern | White reflectance at panel erasure (%) |
|---|---|---|---|---|---|---|---|---|---|
| Panel 10* | 1.5 | 1 | 5* | 85.0/15.0 | 110 | 118 | 9.4 | Poor | 49.7 |
| Panel 11* | 1.7 | 1 | 1 | 85.0/15.0 | 80* | 94* | 32.1 | Poor | 57.8 |
| Panel 12* | 0.5 | 1 | 1 | 85.0/15.0 | 375* | 382* | 8.3 | Poor | 44.1 |
| Panel 13* | 1.0 | 1 | 1 | 77.5/22.5* | 226 | 231 | 8.7 | Poor | 47.8 |
| Panel 14* | 1.0 | 1 | 1 | 92.0/8.0* | 235 | 235 | 20.1 | Poor | 56.3 |

The obtained magnetic panels 1 to 14 were measured and evaluated as below. The results are shown in Table 3.

The measurements were conducted as follows:

Measurement a. Measurement of Magnetization

The magnetization of a magnetic powder sample was measured by using a vibrating sample type magnetometer (VSM-3 made by Toei Kogyo), setting the magnetic powder sample in a holder, and changing the magnetic field applied.

b. Measurement of Effective Magnetic Flux Density

The effective magnetic flux density of a magnet used for a recording magnetic pen in the magnetic display panel was measured by using magnetic display panels 1 to 14 having predetermined thicknesses of sealed spaces as shown in Table 3, placing the tip of the magnetic pen against the screen of the panels in succession, and finding the magnetic flux density at the outer surface of the back panel sheet of each of the magnetic display panels by a handy type magnetometer (FS-5 made by EDS Co.). Similarly, the effective magnetic flux density of a magnet used for an erasing magnetic arm was measured by using magnetic display panels 1 to 14 having predetermined thicknesses of sealed spaces as shown in Table 3, placing the erasing magnet against the outer surface of the back panel sheet, and finding the magnetic flux density at the outer surface of the front panel sheet of each of the magnetic display panels by a handy type magnetometer (FS-5 made by EDS Co.).

c. Measurement of Reflectance (Measurement of Contrast)

The reflectance at the screen of a magnetic display panel was measured using a reflectometer (Reflectmeter/TC-6MC made by Tokyo Denshoku) and placing the reflectometer directly against the display image on the screen of the magnetic display panel. The reflectance was found for both of the case where black was being displayed on the screen of the magnetic display panel (state where magnetic particles 14 shown in FIG. 2 were close to inner surface of front panel sheet 4) and where white was being displayed (state where magnetic particles 14 shown in FIG. 2 were close to inner surface of back panel sheet 6). In the case of the black display, the smaller the reflectance, the better. For example, not more than 20% is preferable. In the case of a white display, the higher the reflectance the better. For example, at least 52% is preferable. To improve the contrast at the screen, the reflectance at the black display is preferably not more than 20% and the reflectance at the white display is preferably not less than 52%. The results are shown in Table 3.

d. Resolution of Displayed Object

The resolution of the displayed object at the screen was confirmed visually. Breaks in the lines shown in FIG. 11A or blurring of the letters shown in FIG. 11B were looked for. In the column on evaluation of the resolution of the displayed object in Table 3, "good" indicates that no line breaks or letter blurring etc. could be observed even with 10 repeated tests, while "poor" indicates that line breaks or letter blurring were observed at least five times after 10 repeated tests.

As will be understood from the above Tables 1 to 3, compared with the magnetophoresis type display devices using magnetic particles, white fluids, magnetic display panels, recording magnetic members, or erasing magnetic members out of the preferable range of numerical values of the present invention, magnetophoresis type display devices using magnetic particles, white fluids, magnetic display panels, recording magnetic members, or erasing magnetic members inside of the preferable range of numerical values of the present invention were confirmed as having no image breaks in display at the boundary portions of the individual cells and as being improved in contrast of the display image and resolution of the display image.

EXAMPLE 2

Preparation of Panel Filling

Predetermined amounts of isoparaffin, titanium oxide, silicon oxide, and alumina were prepared as in the compositions shown in the following Table 4 and were mixed by a homogenizer at 4000 rpm for 5 minutes to obtain the white fluids 21 to 27.

TABLE 4

| | Composition (wt %) | | | | | |
|---|---|---|---|---|---|---|
| Sample | Isoparaffin | Titanium oxide (C) | Silicon oxide (D) | Alumina | C + D | C/D |
| White fluid 21 | 94.0 | 3.5 | 2.0 | 0.5 | 5.5 | 1.75 |
| White fluid 22 | 96.2 | 1.8 | 1.5 | 0.5 | 3.3 | 1.20 |
| White fluid 23 | 94.9 | 3.6 | 1.5 | 0.5 | 5.1 | 2.40 |
| White fluid 24 | 95.0 | 2.5 | 2.0 | 0.5 | 4.5 | 1.25 |
| White fluid 25* | 95.0 | 2.0 | 2.5 | 0.5 | 4.5 | 0.80* |

TABLE 4-continued

| Sample | Composition (wt %) | | | | | |
|---|---|---|---|---|---|---|
| | Isopar-affin | Titanium oxide (C) | Silicon oxide (D) | Alumina | C + D | C/D |
| White fluid 26* | 92.5 | 4.0 | 3.0 | 0.5 | 7.0* | 1.33 |
| White fluid 27* | 96.8 | 1.2 | 1.0 | 0.5 | 2.5* | 1.20 |

Asterisks indicate outside preferable range.

Further, these white fluids were transferred to a plurality of separate containers, added with magnetic powders 21 to 26 of the compositions and magnetic characteristics shown in the following Table 5 (corresponding to magnetic particles 14 in FIG. 1 and FIG. 2), then mixed using a mixer at 300 rpm for 1 minute to obtain the liquid dispersions serving as the panel fillings. The amounts of the magnetic powders added in the liquid dispersions are shown in the following Table 6.

Figure 10B:
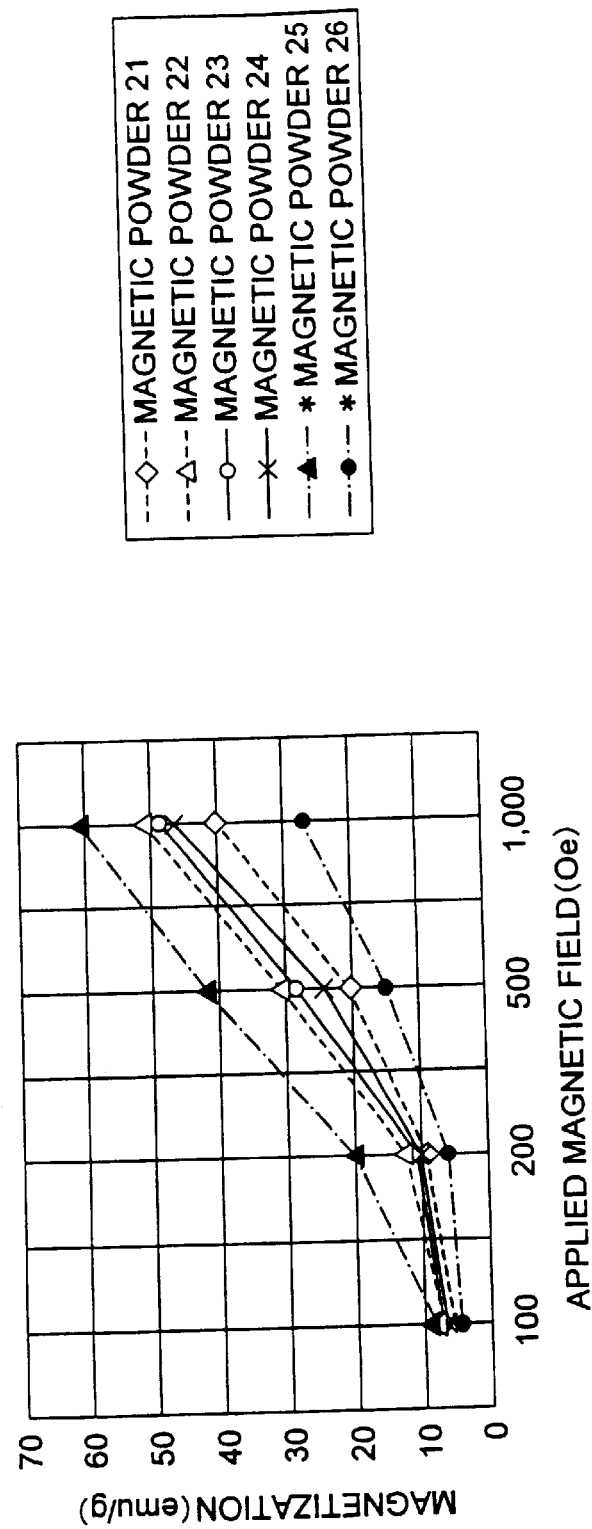

Note that the relationships between the applied magnetic fields and magnetizations in the magnetic powders 21 to 26 are shown in FIG. 10B. The mean particle sizes of the magnetic powders 21 to 26 were from 100 to 120 μm. The mean particle sizes were measured by placing the magnetic powders on various sieves of mesh nos. 83 to 325, shaking them, finding the amounts of the magnetic powders remaining on the respective sieves, then calculating the mean particle sizes from the weight ratios.

TABLE 5

| Sample | Composition (wt %) | | | Magnetization (emu/g) | |
|---|---|---|---|---|---|
| | Magnetic powder | Resin | Coloring agent | Applied magnetic field 200 Oe | Applied magnetic field 500 Oe |
| Magnetic powder 21 | Fe powder 65.0 | Styrene-acryl 31.0 | Carbon 4.0 | 9.2 | 20.5 |
| Magnetic powder 22 | Magnetite 80.0 | Styrene-acryl 18.0 | Carbon 2.0 | 11.5 | 31.5 |
| Magnetic powder 23 | Fe powder 87.0 | Styrene-acryl 12.0 | Carbon 1.0 | 10.4 | 28.7 |
| Magnetic powder 24 | Fe powder 75.0 | Styrene-acryl 23.0 | Carbon 2.0 | 9.7 | 24.1 |
| Magnetic powder 25* | Magnetite 92.5 | Styrene-acryl 7.0* | Carbon 0.5* | 19.8 | 42.1 |
| Magnetic powder 26* | Fe-powder 55.0 | Styrene-acryl 43.0* | Carbon 2.0 | 5.8* | 14.7* |

Asterisks indicate outside preferable range.

Preparation of Magnetic Display Panel

Transparent polyvinyl chloride sheets the same as in Example 1 were prepared as the front panel sheet 4 and back panel sheet 6 shown in FIG. 1, and special paper honeycomb structures similar to Example 1 were prepared as the honeycomb structure 10 shown in FIG. 3.

One surface of each of the honeycomb structures 10 was adhered to the inner surface of a front panel sheet 4 shown in FIG. 1, then the insides of the cell spaces 15 were filled with a filling obtained at the process of preparation of the panel fillings under agitation. When filling the filling, the assembly was turned upside down from FIG. 1 and the front panel sheet 4 was made to be positioned at the bottom. Next, a back panel sheet 6 comprised of a polyvinyl chloride sheet coated with an epoxy-based adhesive was pressed down and adhered to the inner surface of the outer periphery of the front panel sheet 4 and the other surface of the honeycomb structure 10 to completely seal the inside. As a result, the magnetic panels 21 to 38 shown in Table 6 (corresponding to the magnetic display panel 20 shown in FIG. 1) were obtained.

TABLE 6

| Panel sample | Thickness of sealed space (mm) | Filling sample | | Amount of magnetic powder added (wt %) | Effective magnetic flux density of magnetic pen at panel bottom (Gauss) | Effective magnetic flux density of erasure magnet at panel surface (Gauss) |
|---|---|---|---|---|---|---|
| Panel 21 | 1.0 | Magnetic powder 21 | White fluid 21 | 15.0 | 220 | 228 |
| Panel 22 | 1.0 | Magnetic powder 22 | White fluid 22 | 12.0 | 215 | 225 |
| Panel 23 | 1.0 | Magnetic powder 23 | White fluid 23 | 15.0 | 222 | 234 |
| Panel 24 | 1.0 | Magnetic powder 24 | White fluid 24 | 10.0 | 221 | 230 |
| Panel 25 | 0.8 | Magnetic powder 21 | White fluid 24 | 12.0 | 287 | 298 |
| Panel 26 | 0.8 | Magnetic powder 23 | White fluid 21 | 15.0 | 291 | 296 |
| Panel 27 | 1.5 | Magnetic powder 22 | White fluid 23 | 15.0 | 105 | 109 |
| Panel 28 | 1.5 | Magnetic powder 23 | White fluid 22 | 20.0 | 114 | 120 |
| Panel 29 | 1.5 | Magnetic powder 22 | White fluid 21 | 15.0 | 112 | 118 |
| Panel 30* | 1.7* | Magnetic powder 21 | White fluid 21 | 15.0 | 80* | 94* |
| Panel 31* | 0.5* | Magnetic powder 21 | White fluid 21 | 15.0 | 376 | 382 |
| Panel 32* | 1.0 | Magnetic powder 21 | White fluid 25 | 12.0 | 220 | 227 |
| Panel 33* | 1.0 | Magnetic powder 21 | White fluid 26 | 12.0 | 230 | 235 |
| Panel 34* | 1.0 | Magnetic powder 21 | White fluid 27 | 12.0 | 219 | 224 |
| Panel 35* | 1.0 | Magnetic powder 25 | White fluid 21 | 17.5 | 219 | 230 |
| Panel 36* | 1.0 | Magnetic powder 26 | White fluid 21 | 17.5 | 225 | 230 |
| Panel 37* | 1.0 | Magnetic powder 21 | White fluid 21 | 22.5* | 226 | 231 |
| Panel 38* | 1.0 | Magnetic powder 21 | White fluid 21 | 8.0* | 235 | 235 |

Asterisks indicate outside preferable range.

The obtained magnetic panels 21 to 38 were measured and evaluated as below. The results ate shown in Table 7.

The measurements were conducted as follows:

Measurement a. Measurement of Magnetization

The magnetization of a magnetic powder sample was measured in the same way as Example 1.

b. Measurement of Effective Magnetic Flux Density

The effective magnetic flux density of a magnet used for a recording magnetic pen in the magnetic display panel was measured in the same way as Example 1.

c. Measurement of Reflectance (Measurement of Contrast)

The reflectance at the screen of a magnetic display panel was measured in the same way as Example 1. In the case of a black display, the smaller the reflectance, the better. For example, not more than 20% is preferable. In the case of a white display, the higher the reflectance the better. For example, at least 55% is preferable. To improve the contrast at the screen, the reflectance at the black display is preferably not more than 20% and the reflectance at the white display is preferably not less than 55%. The results are shown in Table 7.

d. Resolution of Displayed Object

The resolution of the displayed object at the screen was confirmed visually. Breaks in the lines shown in FIG. 11A or blurring of the letters shown in FIG. 11B were looked for. In the column on evaluation of the resolution of the displayed object in Table 7, "good" indicates that no line breaks or letter blurring etc. could be observed even with 10 repeated tests, while "poor" indicates that line breaks or letter blurring were observed at least five times after 10 repeated tests.

e. Breaks in Display at Boundary Portions of Individual Cells

Breaks in the display at boundary portions of individual cells at the magnetic display panels were checked for visually. In the column on evaluation of breaks in display at the boundary portions of the individual cells in Table 7, "good" indicates that no breaks at the boundary portions of the individual cells could be observed even with 10 repeated tests, while "poor" indicates that breaks at the boundary portions of the individual cells shown in FIG. 11C were observed at least five times after 10 repeated tests.

TABLE 7

| Panel sample | Black reflectance of panel at display (%) | Resolution of displayed object | Break of display at boundary portions of individual cells | White reflectance of panel at erasure (%) |
| --- | --- | --- | --- | --- |
| Panel 21 | 10.5 | Good | Good | 56.2 |
| Panel 22 | 17.2 | Good | Good | 57.1 |
| Panel 23 | 9.5 | Good | Good | 56.3 |
| Panel 24 | 10.2 | Good | Good | 56.5 |
| Panel 25 | 9.6 | Good | Good | 56.0 |
| Panel 26 | 9.2 | Good | Good | 55.1 |
| Panel 27 | 18.2 | Good | Good | 57.2 |
| Panel 28 | 17.5 | Good | Good | 57..1 |
| Panel 29 | 17.6 | Good | Good | 57.6 |
| Panel 30* | 32.1 | Poor | Poor | 57.8 |
| Panel 31* | 8.3 | Poor | Poor | 44.1 |
| Panel 32* | 25.1 | Poor | Poor | 58.9 |
| Panel 33* | 24.5 | Poor | Poor | 58.1 |
| Panel 34* | 9.2 | Poor | Poor | 48.8 |
| Panel 35* | 9.1 | Poor | Poor | 35.5 |
| Panel 36* | 26.6 | Poor | Poor | 59.2 |
| Panel 37* | 8.7 | Poor | Poor | 47.8 |
| Panel 38* | 20.1 | Poor | Poor | 56.3 |

Asterisks indicate outside preferable range.

As will be understood from the above Tables 4 to 7, compared with the magnetophoresis type display devices using magnetic particles, white fluids, magnetic display panels, recording magnetic members, or erasing magnetic members out of the preferable range of numerical values of the present invention, magnetophoresis type display devices using magnetic particles, white fluids, magnetic display panels, recording magnetic members, or erasing magnetic members inside of the preferable range of numerical values of the present invention were able to be confirmed as having no breaks in display at the boundary portions of the individual cells and as being improved in contrast of the display image and resolution of the display image.

EXAMPLE 3

Preparation of Panel Filling

Predetermined amounts of isoparaffin, titanium oxide, zinc oxide, silicon oxide, and alumina were prepared as in the compositions shown in the following Table 8 and were mixed by a homogenizer at 4000 rpm for 5 minutes to obtain the white fluids 41 to 47. When the total wt % of each of the white fluids 41 to 47 is 100 wt %, the wt % of the isoparaffin in the white fluid is A, and the wt % of the white oxide mixture comprised of titanium oxide, zinc oxide, silicon oxide, and alumina is B, the ratio of A/B is as shown in Table 8. Further, the viscosity of each of the white fluids 41 to 47 at a temperature of 25° C. is also shown in Table 8. The viscosity was found using a B-type viscometer (made by Tokyo Keiki) and 500 cc of each white fluid.

TABLE 8

| Liquid sample | Isoparaffin (A) (wt %) | White oxide mixture (B) (wt %) | | | | A/B | Viscosity (cP) |
| --- | --- | --- | --- | --- | --- | --- | --- |
| | | ZnO | TiO$_2$ | Al$_2$O$_3$ | SiO$_2$ | | |
| White fluid 41 | 70 | 2 | 1 | 1 | 2 | 11.7 | 430 |
| White fluid 42 | 70 | 3 | 1 | 0.5 | 2 | 10.8 | 630 |
| White fluid 43 | 70 | 0.5 | 3 | 0 | 1 | 15.6 | 340 |
| White fluid 44 | 70 | 1.5 | 1 | 0.5 | 1 | 17.5 | 420 |
| White fluid 45* | 70 | 3 | 3 | 2 | 0.5 | 8.2* | 245 |
| White fluid 46* | 70 | 1 | 1 | 0.5 | 0.5 | 23.3* | 180* |
| White fluid 47* | 70 | 1 | 3 | 1 | 4 | 7.8* | 1320* |

Asterisks indicate outside preferable range.

Further, separate from the white fluids 41 to 47, colored magnetic powders 41 to. 47 of the compositions and magnetization characteristics shown in the following Table 9 were prepared (corresponding to colored magnetic particles 14a to 14c in FIG. 4 and FIG. 5).

TABLE 9

| Magnetic powder sample | Magnetization at 500 Oe applied magnetic field (emu/g) | Particle size (μm) |
| --- | --- | --- |
| Black magnetic powder 41 | 20.6 | 150 |
| Black magnetic powder 42 | 24.5 | 120 |
| Black magnetic powder 43 | 23.2 | 75 |
| Black magnetic powder 44 | 22.1 | 180 |
| Black magnetic powder 45* | 18.4* | 100 |
| Black magnetic powder 46* | 21.2 | 40* |
| Black magnetic powder 47* | 25.1 | 225* |

Asterisks indicate outside preferable range.

In Table 9, the black magnetic powder 41 is comprised of magnetic particles consisting of 70 wt % of a magnetic material consisting primarily of Fe and 30 wt % of a covering synthetic resin comprised of a coloring agent consisting of carbon and a styrene-acryl resin. The mean particle size and magnetization characteristic are shown in Table 9.

The blue magnetic powder 42 is comprised of magnetic particles consisting of 85 wt % of a magnetic material consisting primarily of Fe and 15 wt % of a covering synthetic resin comprised of a coloring agent consisting of a Co—Mn-based complex oxide and a polyester resin. The mean particle size and magnetization characteristic are shown in Table 9.

The red magnetic powder 43 is comprised of magnetic particles consisting of 85 wt % of a magnetic material consisting primarily of Fe and 15 wt % of a covering synthetic resin comprised of a coloring agent consisting of hematite and a styrene-acryl resin. The mean particle size and magnetization characteristic are shown in Table 9.

The green magnetic powder 44 is comprised of magnetic particles consisting of 80 wt % of a magnetic material consisting primarily of Fe and 20 wt % of a covering synthetic resin comprised of a coloring agent consisting of a Co—Mn-based complex oxide and a polyester resin. The mean particle size and magnetization characteristic are shown in Table 9.

The black magnetic powder 45 is comprised of magnetic particles consisting of 60 wt % of a magnetic material consisting primarily of Fe and 40 wt % of a covering synthetic resin comprised of a coloring agent consisting of carbon and a polyester resin. The mean particle size and magnetization characteristic are shown in Table 9.

The black magnetic powder 46 is comprised of magnetic particles consisting of 75 wt % of a magnetic material consisting primarily of Fe and 25 wt % of a covering synthetic resin comprised of a coloring agent consisting of carbon and a styrene-acryl resin. The mean particle size and magnetization characteristic are shown in Table 9.

The red magnetic powder 47 is comprised of magnetic particles consisting of 65 wt % of a magnetic material consisting primarily of magnetite and 35 wt % of a covering synthetic resin comprised of a coloring agent consisting of hematite and a polyester resin. The mean particle size and magnetization characteristic are shown in Table 9. Note that the mean particle sizes of the colored magnetic powders 41 to 47 were measured by placing the colored magnetic powders on various sieves of mesh nos. 83 to 325, shaking them, finding the amounts of the colored magnetic powders remaining on the respective sieves, then calculating the mean particle sizes from the weight ratios.

Next, the white fluids 41 to 47 prepared in Table 8 were transferred to a plurality of separate containers, added with colored magnetic powders 41 to 47 of the compositions and magnetic characteristics shown in the Table 9, then mixed using a mixer at 300 rpm for 1 minute to obtain the liquid dispersions serving as the panel fillings. The amounts of the colored magnetic powders added in the liquid dispersions were 10 to 20 wt % of the colored magnetic powders 41 to 47 with respect to 80 to 90 wt % of the white fluids 41 to 47. The combinations of the white fluids and the magnetic powders are shown in the following Table 10.

TABLE 10

| Panel sample | Panel thickness (mm) | Filling sample Fluid | Filling sample Magnetic powder | Effective magnetic flux density of magnetic pen at panel bottom (Gauss) | Effective magnetic flux density of erasure magnet at panel surface (Gauss) |
|---|---|---|---|---|---|
| Panel 41 | 1.3 | 41 | 41 & 42 | 310 | 670 |
| Panel 42 | 1.0 | 42 | 42 & 43 | 380 | 965 |
| Panel 43 | 0.8 | 41 | 42, 43 & 44 | 480 | 1300 |
| Panel 44 | 1.0 | 41 | 41, 42, 43, 44 | 325 | 470 |
| Panel 45 | 1.5 | 41 | 41 & 42 | 155 | 320 |
| Panel 46 | 1.3 | 43 | 41 & 42 | 345 | 625 |
| Panel 47 | 1.3 | 44 | 41 & 42 | 320 | 560 |
| Panel 48* | 1.3 | 41 | 41 & 47 | 225 | 340 |
| Panel 49* | 0.5* | 42 | 41 & 42 | 540* | 1750* |
| Panel 50* | 2.0* | 42 | 41 & 42 | 98* | 250* |
| Panel 51* | 1.3 | 42 | 45 & 42* | 250 | 390 |
| Panel 52* | 1.3 | 45* | 46 & 43* | 275 | 290* |
| Panel 53* | 1.3 | 43 | 41 & 42 | 300 | 215* |
| Panel 54* | 1.3 | 46* | 41 & 42 | 265 | 460 |
| Panel 55* | 1.3 | 47* | 41 & 42 | 270 | 625 |

Asterisks indicate outside preferable range.

Preparation of Magnetic Display Panel

Polyvinyl chloride sheets the same as in Example 1 were prepared as the front panel sheet 4 and back panel sheet 6 shown in FIG. 4, and special paper honeycomb structures similar to Example 1 were prepared as the honeycomb structure 10 shown in FIG. 3.

As shown in FIG. 9, the bottom surface of each of the honeycomb structures 10 was adhered to the inner surface of a front panel sheet 4 using an epoxy-based adhesive, then the insides of the cell spaces 15 were filled with a filling obtained at the process of preparation of the panel fillings under agitation. When filling the fillings, in panel samples 41 to 55 shown in Table 10, at least two types of colored magnetic powders were sealed in the same panel samples so as to enable at least two-color multicolor displays. When filling, masking tape was used to divide a screen into predetermined blocks and each block filled with a white fluid containing a different colored magnetic powder.

Next, a back panel sheet 6 comprised of a polyvinyl chloride sheet coated with an epoxy-based adhesive was pressed down and adhered to the inner surface of the outer periphery of the front panel sheet 4 and the other surface of the honeycomb structure 10 and the outer periphery 40 was heat bonded to completely seal the inside. As a result, the magnetic panels 41 to 55 shown in Table 10 (corresponding to the magnetic display panel 120 shown in FIG. 4) were obtained.

The obtained magnetic panels 41 to 45 were measured and evaluated as below. The results are shown in Table 11.

The measurements were conducted as follows:

Measurement a. Measurement of Magnetization

The magnetization of a colored magnetic powder sample was measured using the same device as in Example 1, setting the colored magnetic powder sample in a holder, and applying a magnetic field of 500 Oe.

b. Measurement of Effective Magnetic Flux Density

The effective magnetic flux density of a magnet used for a recording magnetic pen in the magnetic display panel was measured in the same way as Example 1.

c. Measurement of Reflectance (Measurement of Contrast)

The reflectance at the screen of a magnetic display panel was measured in the same way as Example 1. In the case of a white display, the higher the reflectance the better. To improve the contrast at the screen, the reflectance at the white display is preferably not less than 55%. The results are shown in Table 11.

d. Resolution of Displayed Object

The resolution of the displayed object at the screen was confirmed visually in the same way as in Example 1. Blurring of the letters shown in FIG. 11B was looked for. In the column on evaluation of the resolution of the displayed object in Table 11, "good" indicates that no letter blurring etc. could be observed even with 10 repeated tests, while "poor" indicates that letter blurring was observed at least five times after 10 repeated tests.

e. Breaks in Display at Boundary Portions of Individual Cells

Breaks in the display at boundary portions of individual cells at the magnetic display panels were checked for visually in the same way as in Example 2. In the column on evaluation of breaks in display at the boundary portions of the individual cells in Table 11, "good" indicates that no breaks at the boundary portions of the individual cells could be observed as shown in FIG. 11D even with 10 repeated tests, while "poor" indicates that breaks at the boundary portions of the individual cells shown in FIG. 11C were observed at least five times after 10 repeated tests.

f. Clearness of Multiple Colors When Displayed at Panel Screen

The clearness of the multiple colors when displayed at the panel screen was confirmed visually. The clearness of the hues and bleeding of the colors was looked for.

In the column on evaluation of the clearness of multiple colors in the following Table 11, "good" indicates that the hues were clear and no color bleeding could be observed even after 10 repeated tests, while "poor" indicates that unclearness of hues or color bleeding was observed at least five times after 10 repeated tests.

TABLE 11

| Panel sample | Clearness of multiple colors of panel display | Resolution of displayed object | Break of display at boundary portions of individual cells | White reflectance of panel at erasure (%) |
|---|---|---|---|---|
| Panel 41 | Good | Good | Good | 60.3 |
| Panel 42 | Good | Good | Good | 59.5 |
| Panel 43 | Good | Good | Good | 58.1 |
| Panel 44 | Good | Good | Good | 60.1 |
| Panel 45 | Good | Good | Good | 65.2 |
| Panel 46 | Good | Good | Good | 63.2 |
| Panel 47 | Good | Good | Good | 61.4 |
| Panel 48* | Poor | Poor | Poor | 59.8 |
| Panel 49* | Poor | Poor | Good | 43.1 |
| Panel 50* | Poor | Poor | Poor | 68.2 |
| Panel 51* | Poor | Poor | Poor | 65.6 |
| Panel 52* | Poor | Poor | Poor | 47.6 |
| Panel 53* | Good | Good | Good | 53.2 |
| Panel 54* | Poor | Poor | Poor | 38.3 |
| Panel 55* | Poor | Poor | Poor | 70.2 |

Asterisks indicate outside preferable range.

As will be understood from the above Tables 8 to 11, compared with the magnetophoresis type color display devices using colored magnetic particles, white fluids, magnetic display panels, recording magnetic members, or erasing magnetic members out of the preferable-range of numerical values of the present invention, magnetophoresis type color display devices using colored magnetic particles, white fluids, magnetic display panels, recording magnetic members, or erasing magnetic members inside of the preferable range of numerical values of the present invention were able to be confirmed as having no breaks in display at the boundary portions of the individual cells, having no color bleeding, being clear in hues, and being improved in resolution of the display image.

EXAMPLE 4

Preparation of Panel Fillings

Predetermined amounts of isoparaffin, titanium oxide, zinc oxide, silicon oxide, and alumina were prepared as in the compositions shown in Table 8 and were mixed by a homogenizer at 4000 rpm for 5 minutes to obtain the white fluids 41 to 47.

Further, separate from the white fluids 41 to 47, in the same way as Example 3, colored magnetic powders 41 to 47 of the compositions and magnetization characteristics shown in Table 9 were prepared (corresponding to colored magnetic particles 14a to 14c in FIG. 1 and FIG. 2).

Next, the white fluids 41 to 47 prepared in Table 8 were transferred to a plurality of separate containers, added with colored magnetic powders 41 to 47 of the compositions and magnetic characteristics shown in Table 9, then mixed using a mixer at 300 rpm for 1 minute to obtain the liquid dispersions serving as the panel fillings. The amounts of the colored magnetic powders added in the liquid dispersions were 10 to 20 wt % of the colored magnetic powders 41 to 47 with respect to 80 to 90 wt % of the white fluids 41 to 47. The combinations of the white fluids and the magnetic powders are shown in the following Table 12.

TABLE 12

| Panel sample | Panel thickness (mm) | Filling sample Fluid | Filling sample Magnetic powder | Effective magnetic flux density of magnetic pen at panel bottom (Gauss) | Effective magnetic flux density of erasure magnet at panel surface (Gauss) |
|---|---|---|---|---|---|
| Panel 61 | 1.3 | 41 | 41 & 42 | 320 | 610 |
| Panel 62 | 1.0 | 42 | 42 & 43 | 380 | 980 |
| Panel 63 | 0.8 | 43 | 42, 43 & 44 | 500 | 1250 |
| Panel 64 | 1.0 | 42 | 41, 42, 43, 44 | 305 | 460 |
| Panel 65 | 1.5 | 41 | 41 | 175 | 400 |
| Panel 66 | 1.3 | 43 | 41, 42 & 44 | 345 | 775 |
| Panel 67 | 1.3 | 44 | 43 & 44 | 380 | 540 |
| Panel 68* | 1.3 | 41 | 44 & 47 | 210 | 340 |
| panel 69* | 0.5* | 42 | 41 & 42 | 570* | 1600* |
| Panel 70* | 2.0* | 42 | 41 & 42 | 90* | 300 |
| Panel 71* | 1.3 | 42 | 45 & 41* | 270 | 420 |
| Panel 72* | 1.3 | 45* | 46 & 41* | 225 | 290 |
| Panel 73* | 1.3 | 43 | 42 & 43 | 320 | 200* |
| Panel 74* | 1.3 | 46* | 41 & 42 | 290 | 485 |
| Panel 75* | 1.3 | 47* | 41 & 42 | 275 | 840 |
| Panel 76* | 1.3 | 41 | 41 & 42 | 320 | 610 |

Asterisks indicate outside preferable range.

Preparation of Magnetic Display Panel

A transparent PET sheet of a thickness of 0.20 mm was prepared as the front panel sheet 4 shown in FIG. 4, a transparent PET sheet of a thickness of 0.10 mm was prepared as the back panel sheet 6, and these were used as the panel sheets for the panel samples 61 to 75 in Table 12. Note that for only the panel sample 76 shown in Table 12, a transparent polyvinyl chloride sheet of a thickness of 0.20 mm was prepared as the front panel sheet 4 shown in FIG. 1 and a transparent polyvinyl chloride sheet of a thickness of 0.10 mm was prepared as the back panel sheet 6. Further, special paper honeycomb structures were prepared as the honeycomb structure 10 shown in FIG. 3 and used as the honeycomb structures for the panel samples 61 to 76 in Table 12.

Each honeycomb structure 10, as shown in FIG. 6A, was compacted in one direction to form a honeycomb preshaping block 10a in the state before attachment. Tensile force F of 94 gf was made to act from the two sides of the honeycomb preshaping block 10a to expand the block 10a to open up the cell spaces 15 as shown in FIG. 6B.

In the block 10a state, the length L1 in one direction was 4.5 cm, but the length L2 of the structure 10 after expansion was 57.6 cm. Further, the open length L3 of the cell spaces 15 in the structure 10 after expansion was 4.2 mm, while the open length L3 after 30 seconds right after release of the tensile force F was 3.0 mm. In that state, a solidifying agent was sprayed onto the honeycomb structure 10. The solidifying agent used was a solution of 20 wt % of styrene-acryl copolymer in 80 wt % of ethyl acetate.

In the state with the cell spaces 15 opened up and the shrinkage of the honeycomb structure 10 suppressed, the honeycomb structure 10 was cut to a predetermined size. Next, as shown in FIG. 7, the cut honeycomb structure 10 is placed into and adhered to the depression 4b of the front panel sheet 4 having the depression 4b at its inside. At the time of the adhesion, a vinyl acetate-based adhesive was used.

In this state, the cross sectional area of the cell spaces 15 in the honeycomb structures 10 was 3.0 $mm^2$, while the thickness of the partitions partitioning the cell spaces 15 was 0.05 mm. As the honeycomb structures 10, ones having various heights H (see FIG. 3) were prepared. The heights H corresponded to the thickness T of the sealed spaces 8 shown in FIG. 5. Ones of various thicknesses (corresponding to the panel thicknesses in Table 12) were prepared as shown in the above Table 12.

As shown in FIG. 9, one surface of each of the honeycomb structures 10 was adhered to the inner surface of a front panel sheet 4, then the insides of the cell spaces 15 were filled with a filling obtained at the process of preparation of the panel fillings under agitation. When filling the filling, in panel samples 61 to 76 shown in Table 12 (except panel sample 65), at least two types of colored magnetic powders were sealed in the same panel samples so as to enable at least two-color multicolor displays. When filling, masking tape (Nitto Tape (18 mm)) having an adhesive surface was used to divide a screen into predetermined blocks and each block filled with a white fluid containing a different colored magnetic powder. Next, a rubber blade was used to manually wipe the surface several times. Note that a white fluid containing a single type of magnetic powder 41 was sealed in the panel sample 65.

Next, as shown in FIG. 9, a back panel sheet 6 coated with a vinyl acetate-based adhesive was pressed down and adhered to the inner surface of the outer periphery of the front panel sheet 4 and the other surface of the honeycomb structure 10 and the outer periphery 40 was heat bonded using a high frequency type welder at a heating temperature of 100° C. for 5 seconds to completely seal the inside. As a result, the magnetic panels 61 to 76 shown in Table 12 (corresponding to the magnetic display panel 120 shown in FIG. 4) were obtained.

The obtained magnetic panels 61 to 76 were measured and evaluated as below. The results are shown in Table 13.

The measurements were conducted as follows:

Measurement a. Measurement of Magnetization

The magnetization of a colored magnetic powder sample was measured using the same device as in Example 1, setting the colored magnetic powder sample in a holder, and applying a magnetic field of 500 Oe.

b. Measurement of Effective Magnetic Flux Density

The effective magnetic flux density of a magnet used for a recording magnetic pen in the magnetic display panel was measured in the same way as Example 1.

c. Measurement of Reflectance (Measurement of Contrast)

The reflectance at the screen of a magnetic display panel was measured in the same way as Example 1. In the case of a white display, the higher the reflectance the better. To improve the contrast at the screen, the reflectance at the white display is preferably not less than 55%. The results are shown in Table 13.

d. Resolution of Displayed Object

The resolution of the displayed object at the screen was confirmed visually in the same way as in Example 1. Blurring of the letters shown in FIG. 11B was looked for. In the column on evaluation of the resolution of the displayed object in Table 13, "good" indicates that no letter blurring etc. could be observed even with 10 repeated tests, while "poor" indicates that letter blurring was observed at least five times after 10 repeated tests.

e. Breaks in Display at Boundary Portions of Individual Cells

Breaks in the display at boundary portions of individual cells at the magnetic display panels were checked for visually in the same way as in Example 2. In the column on evaluation of breaks in display at the boundary portions of the individual cells in Table 13, "good" indicates that no breaks at the boundary portions of the individual cells could be observed as shown in FIG. 11D even with 10 repeated tests, while "poor" indicates that breaks at the boundary portions of the individual cells shown in FIG. 11C were observed at least five times after 10 repeated tests.

f. Clearness of Multiple Colors When Displayed at Panel Screen

The clearness of the multiple colors when displayed at the panel screen was confirmed visually. The clearness of the hues and bleeding of the colors was looked for.

In the column on evaluation of the clearness of multiple colors in the following Table 13, "good" indicates that the hues were clear and no color bleeding could be observed even after 10 repeated tests, while "poor" indicates that unclearness of hues or color bleeding was observed at least five times after 10 repeated tests.

TABLE 13

| Panel sample | Clearness of multiple colors of panel display | Resolution of displayed object | Break of display at boundary portions of individual cells | White reflectance of panel at erasure (%) |
|---|---|---|---|---|
| Panel 61 | Good | Good | Good | 62.5 |
| Panel 62 | Good | Good | Good | 61.1 |
| Panel 63 | Good | Good | Good | 59.8 |

TABLE 13-continued

| Panel sample | Clearness of multiple colors of panel display | Resolution of displayed object | Break of display at boundary portions of individual cells | White reflectance of panel at erasure (%) |
|---|---|---|---|---|
| Panel 64 | Good | Good | Good | 63.2 |
| Panel 65 | Good | Good | Good | 64.1 |
| Panel 66 | Good | Good | Good | 66.2 |
| Panel 67 | Good | Good | Good | 62.7 |
| Panel 68* | Poor | Poor | Poor | 58.8 |
| Panel 69* | Poor | Poor | Good | 48.2 |
| Panel 70* | Poor | Poor | Poor | 70.2 |
| Panel 71* | Poor | Poor | Poor | 68.9 |
| Panel 72* | Poor | Poor | Poor | 49.3 |
| Panel 73* | Good | Good | Good | 52.7 |
| Panel 74* | Poor | Poor | Poor | 42.5 |
| Panel 75* | Poor | Poor | Poor | 72.8 |
| Panel 76* | Good | Good | Good | 58.5 |

Asterisks indicate outside preferable range.

As will be understood from the above Tables 8, 9, 12, and 13, compared with the magnetophoresis type color display devices out of the preferable range of numerical values of the present invention, magnetophoresis type color display devices inside of the preferable range of numerical values of the present invention were able to be freed from breaks in display at the boundary portions of the individual cells, freed from color bleeding, made clear in hues, and improved in resolution of the display image.

Further, as shown in Table 13, by comparison with panel sample 61 and panel sample 76 exactly the same in conditions except for using a PET or using a polyvinyl chloride sheet as the material of the front panel sheet and the back panel sheet, it was learned that panel sample 61 using PET was improved in the panel white reflectance. By improving the panel white reflectance, an improvement in the contrast at the color display can be expected.

Next, to confirm the effect of the wiping, panel sample 77 was prepared in the same way as panel sample 61 except for no wiping. Panel sample 77 was observed to have differences in filling levels of the individual cells when filled with the liquid dispersion.

Panel sample 61 and panel sample 77 were tested for clearness of multiple colors, resolution of the displayed object, breaks in display at the boundary portoins of the individual cells, and panel white reflectance at the time of erasure of an image. The results are shown in Table 14.

TABLE 14

| Panel sample | Clearness of multiple colors of panel display | Resolution of displayed object | Break of display at boundary portions of individual cells | White reflectance of panel at erasure (%) |
|---|---|---|---|---|
| Panel 61 | Good | Good | Good | 62.5 |
| Panel 77 | Poor | Poor | Poor | 60.2 |

As shown in Table 14, compared with panel sample 77, it was confirmed that the panel sample 61 had a higher whiteness at the time of erasure, a good display, and a good resolution.

What is claimed is:

1. A process of production of a magnetophoresis type display device comprising:

attaching to a depression of a transparent front panel sheet formed with a depression at its inner surface and comprised of polyethylene terephthalate, a partitioning member formed with a large number of cell spaces in which the partitioning member is comprised of a honeycomb structure and is supplied with the honeycomb structure in a compact state;

opening up the compact honeycomb structure so as to open up the cell spaces, coating a solidifying agent on the honeycomb structure in the state with the cell spaces opened up, attaching the honeycomb structure coated with the solidifying agent to the depression of the front panel sheet, filling insides of the cell spaces of the partitioning member with a liquid dispersion containing magnetic particles, and bonding an inner surface of an outer periphery of a back panel sheet and an inner surface of an outer periphery of the front panel sheet together so as to seal the liquid dispersion filled at the insides of the cell spaces.

2. A process of production of a magnetophoresis type display device comprising:

attaching to a depression of a transparent front panel sheet formed with a depression at its inner surface a partitioning member formed with a large number of cell spaces, preparing as a liquid dispersion at least a first liquid dispersion containing first colored magnetic particles and a second liquid dispersion containing second colored magnetic particles colored different from the first colored magnetic particles, masking by a first masking member the cells other than selected specific cells in the cells formed by partitioning by the partitioning member and filling only insides of the selected specific cells with the first liquid dispersion, squeeging the first liquid dispersion from the top of the first masking member, removing the first masking member, masking by a second masking member cells other than selected specific cells in the cells not filled with the first liquid dispersion and filling only insides of the selected specific cells not masked by the second masking member with the second liquid dispersion, squeeging the second liquid dispersion from the top of the second masking member, and bonding an inner surface of an outer periphery of a back panel sheet and an inner surface of an outer periphery of the front panel sheet together so as to seal the liquid dispersion filled at the insides of the cell spaces.

3. A process of production of a magnetophoresis type display device as set forth in claim 2, further comprising making the front panel sheet by polyethylene terephthalate.

4. A process of production of a magnetophoresis type display device comprising:

attaching to a depression of a transparent front panel sheet formed with a depression at its inner surface a partitioning member formed with a large number of cell spaces, in which the partitioning member has a honeycomb structure and is supplied with the honeycomb structure in a compact state;

opening up the compact honeycomb structure so as to open up the cell spaces, coating a solidifying agent on the honeycomb structure in the state with the cell spaces opened up, and attaching the honeycomb structure coated with the solidifying agent to the depression of the front panel sheet, bonding an inner surface of an outer periphery of a back panel sheet and an inner surface of an outer periphery of the front panel sheet together so as to seal the liquid dispersion filled at the insides of the cell spaces.

5. A process of production of a magnetophoresis type display device as set forth in claim 4, further comprising making the front panel sheet by polyethylene terephthalate.

6. A process of production of a magnetophoresis type display device comprising:

attaching to a depression of a transparent front panel sheet formed with a depression at its inner surface a partitioning member formed with a large number of cell spaces, filling insides of the cell spaces of the partitioning member with a liquid dispersion containing magnetic particles, squeeging the liquid dispersion protruding from cell spaces of the partitioning member, and bonding an inner surface of an outer periphery of a back panel sheet and an inner surface of an outer periphery of the front panel sheet together so as to seal the liquid dispersion filled at the insides of the cell spaces, wherein the thickness of the cell spaces to 0.8 to 1.5 mm.

7. A process of production of a magnetophoresis type display device as set forth in claim 6, further comprising making the front panel sheet by polyethylene terephthalate.

8. A process of production of a magnetophoresis type display device comprising:

attaching to a depression of a transparent front panel sheet formed with a depression at its inner surface a partitioning member formed with a large number of cell spaces, filling insides of the cell spaces of the partitioning member with a liquid dispersion containing magnetic particles, squeeging the liquid dispersion protruding from cell spaces of the partitioning member, and bonding an inner surface of an outer periphery of a back panel sheet and an inner surface of an outer periphery of the front panel sheet together so as to seal the liquid dispersion filled at the insides of the cell spaces, wherein the magnetic particles having a mean particle size of 50 to 200 um and further having a magnetization of 20.0 emu/g when a magnetic field of 500 Oe is applied to the magnetic particles.

9. A process of production of a magnetophoresis type display device as set forth in claim 8, further comprising making the front panel sheet by polyethylene terephthalate.

10. A process of production of a magnetophoresis type display device comprising:

attaching to a depression of a transparent front panel sheet formed with a depression at its inner surface a partitioning member formed with a large number of cell spaces, filling insides of the cell spaces of the partitioning member with a liquid dispersion containing magnetic particles, squeeging the liquid dispersion protruding from cell spaces of the partitioning member, and bonding an inner surface of an outer periphery of a back panel sheet and an inner surface of an outer periphery of the front panel sheet together so as to seal the liquid dispersion filled at the insides of the cell spaces, wherein using as the liquid dispersion a liquid including a single-color fluid in which colored magnetic particles are dispersed and the viscosity of the single-color fluid is 200 to 800 cp at 25° C.

11. A process of production of a magnetophoresis type display device as set forth in claim 10, further comprising using as the single-color fluid a white fluid.

12. A process of production of a magnetophoresis type display device as set forth in claim 11, wherein the white fluid includes at least isoparaffin and a mixture of a plurality of white inorganic oxides in which when the total weight of the white fluid is 100 wt %, the wt % of the isoparaffin in the white fluid is A and the wt % of the mixture of the white inorganic oxides is B, the weight ratio A/B is in the relationship of $10 \leq A/B \leq 20$.

13. A process of production of a magnetophoresis type display device as set forth in claim 10, wherein the single-color fluid includes at least a dispersion medium and a single-color pigment in which when the total weight of the single-color fluid is 100 wt %, the wt % of the dispersion medium in the single-color fluid is A', and the wt % of the single-color pigment is B', the weight ratio A'/B' is in the relationship of $10 \leq A'/B' \leq 20$.

14. A process of production of a magnetophoresis type display device as set forth in claim 10, further comprising making the front panel sheet by polyethylene terephthalate.

15. A process of production of a magnetophoresis type display device comprising:

attaching to a depression of a transparent front panel sheet formed with a depression at its inner surface a partitioning member formed with a large number of cell spaces, filling insides of the cell spaces of the partitioning member with a liquid dispersion containing magnetic particles, squeeging the liquid dispersion protruding from cell spaces of the partitioning member, bonding an inner surface of an outer periphery of a back panel sheet and an inner surface of an outer periphery of the front panel sheet together so as to seal the liquid dispersion filled at the insides of the cell spaces;

arranging a recording magnetic member able to move along the outer surface of the front panel sheet, and using as the recording magnetic member a magnetic member having a magnetic force of an extent giving an effective magnetic flux density of 100 to 500 Gauss at the outer surface of the back panel sheet in the state when the recording magnetic member is brought into contact with the outer surface of the front panel sheet.

16. A process of production of a magnetophoresis type display device as set forth in claim 15, further comprising making the front panel sheet by polyethylene terephthalate.

17. A process of production of a magnetophoresis type display device comprising:

attaching to a depression of a transparent front panel sheet formed with a depression at its inner surface a partitioning member formed with a large number of cell spaces, filling insides of the cell spaces of the partitioning member with a liquid dispersion containing magnetic particles, squeeging the liquid dispersion protruding from cell spaces of the partitioning member, bonding an inner surface of an outer periphery of a back panel sheet and an inner surface of an outer periphery of the front panel sheet together so as to seal the liquid dispersion filled at the insides of the cell spaces;

arranging an erasing magnetic member at the outer surface of the back panel sheet, and using as the erasing magnetic member an magnetic member having a magnetic force of an extent giving an effective magnetic flux density of 100 to 1500 Gauss at the outer surface of the front panel sheet in the state when the erasing magnetic member is brought into contact with the outer surface of the back panel sheet.

18. A process of production of a magnetophoresis type display device as set forth in claim 17, further comprising making the front panel sheet by polyethylene terephthalate.

* * * * *